US012595161B2

(12) United States Patent
De Jong

(10) Patent No.: US 12,595,161 B2
(45) Date of Patent: Apr. 7, 2026

(54) MOBILE LIFTING COLUMN, LIFTING SYSTEM COMPRISING ONE OR MORE OF SUCH LIFTING COLUMNS, AND METHOD FOR LIFTING A VEHICLE

(71) Applicant: Stertil B.V., Kootstertille (NL)

(72) Inventor: Jurjen Jan De Jong, Buitenpost (NL)

(73) Assignee: Stertil B.V., Kootstertille (NL)

( * ) Notice: Subject to any disclaimer, the term of this patent is extended or adjusted under 35 U.S.C. 154(b) by 1025 days.

(21) Appl. No.: 17/257,066

(22) PCT Filed: Jul. 3, 2019

(86) PCT No.: PCT/NL2019/050408
§ 371 (c)(1),
(2) Date: Dec. 30, 2020

(87) PCT Pub. No.: WO2020/009571
PCT Pub. Date: Jan. 9, 2020

(65) Prior Publication Data

US 2021/0122619 A1 Apr. 29, 2021

(30) Foreign Application Priority Data

Jul. 3, 2018 (NL) ..................................... 2021228

(51) Int. Cl.
*B66F 3/46* (2006.01)
*B66F 3/24* (2006.01)
*B66F 7/10* (2006.01)

(52) U.S. Cl.
CPC .................. *B66F 3/46* (2013.01); *B66F 7/10* (2013.01); *B66F 3/24* (2013.01)

(58) Field of Classification Search
CPC ...... B66F 3/46; B66F 3/24; B66F 3/30; B66F 7/20; B66F 7/16; B66F 7/10; B66F 7/04; B66F 9/24; H04B 7/24; B62B 2203/10
USPC ............................... 254/89 R, 89 H; 187/208
See application file for complete search history.

(56) References Cited

U.S. PATENT DOCUMENTS 4,589,669 A * 5/1986 Kedem ................ B62B 3/0618 280/43.12
4,599,034 A 7/1986 Kennedy et al.
4,856,618 A * 8/1989 Isogai ...................... B66F 7/04 187/209

(Continued)

FOREIGN PATENT DOCUMENTS

DE 4306680 A1 9/1994
EP 0341579 A2 11/1989

(Continued)

*Primary Examiner* — Michael A Gump
(74) *Attorney, Agent, or Firm* — The Webb Law Firm

(57) ABSTRACT

The invention relates to a mobile lifting column, a lifting system including one or more of such lifting columns, and a method for lifting a vehicle. The mobile lifting column includes a frame with a moveable carrier. The carrier includes a carrier part and a guiding part with the carrier configured for carrying the vehicle. The mobile lifting column also includes a drive system which acts on the carrier and is configured for raising and/or lowering the carrier relative to the frame, and a lifting controller configured for controlling movement of the carrier. The guiding part of the carrier includes a U-shaped guiding part.

19 Claims, 26 Drawing Sheets

(56) References Cited

U.S. PATENT DOCUMENTS

| | | | | |
|---|---|---|---|---|
| 6,382,358 | B1 * | 5/2002 | Kritzer | B66F 7/04 187/363 |
| 6,983,196 | B2 * | 1/2006 | Green | B66F 7/20 254/93 L |
| 7,500,816 | B2 | 3/2009 | Berends et al. | |
| 7,744,335 | B1 * | 6/2010 | Cleary | B66F 9/065 254/10 R |
| 9,663,129 | B1 * | 5/2017 | Allen | B62B 1/12 |
| 9,803,664 | B2 * | 10/2017 | Petersen | G01S 15/02 |
| 10,569,999 | B2 | 2/2020 | Van Houten et al. | |
| 10,662,043 | B2 | 5/2020 | De Jong | |
| 2005/0254923 | A1 * | 11/2005 | Gorski | B62B 3/104 414/426 |
| 2006/0055134 | A1 * | 3/2006 | McLoughlin | B62B 1/14 280/47.28 |
| 2006/0115353 | A1 | 6/2006 | Berends et al. | |
| 2006/0182563 | A1 | 8/2006 | De Jong et al. | |
| 2010/0108445 | A1 * | 5/2010 | Kritzer | B66F 3/46 187/218 |
| 2015/0222207 | A1 * | 8/2015 | Matsushita | H02P 3/14 318/376 |
| 2015/0232309 | A1 * | 8/2015 | Jaipaul | B66F 7/04 414/800 |
| 2015/0307334 | A1 * | 10/2015 | Van Houten | B66F 3/46 254/89 R |
| 2015/0329336 | A1 | 11/2015 | Brown et al. | |
| 2015/0368079 | A1 * | 12/2015 | Scholfield | B66F 9/125 414/642 |
| 2016/0052757 | A1 | 2/2016 | De Jong | |
| 2016/0152454 | A1 | 6/2016 | Stapensea et al. | |
| 2016/0185580 | A1 * | 6/2016 | Luinge | B66F 3/46 414/800 |
| 2016/0374775 | A1 * | 12/2016 | Prpa | A61B 50/20 705/3 |
| 2017/0088405 | A1 * | 3/2017 | De Jong | B66F 7/28 |
| 2017/0174484 | A1 | 6/2017 | Van Houten et al. | |
| 2018/0194601 | A1 | 7/2018 | Van Houten | |
| 2024/0067509 | A1 * | 2/2024 | de Jong | B66F 3/46 |

FOREIGN PATENT DOCUMENTS

| | | | |
|---|---|---|---|
| NL | 2013152 | B1 | 9/2016 |
| WO | 2015163757 | A1 | 10/2015 |
| WO | 2017007311 | A1 | 1/2017 |
| WO | 2017010879 | A1 | 1/2017 |

* cited by examiner

MOBILE LIFTING COLUMN, LIFTING SYSTEM COMPRISING ONE OR MORE OF SUCH LIFTING COLUMNS, AND METHOD FOR LIFTING A VEHICLE

CROSS-REFERENCE TO RELATED APPLICATIONS

"This application is the United States national phase of International Application No. PCT/NL2019/050408 filed Jul. 3, 2019, and claims priority to The Netherlands Patent Application No. 2021228 filed Jul. 3, 2018, the disclosures of which are hereby incorporated by reference in their entirety." now reads "This application is the United States national phase of International Application No. PCT/NL2019/050408 filed Jul. 3, 2019, and claims priority to The Netherlands Patent Application No. 2021228 filed Jul. 3, 2018.

BACKGROUND OF THE INVENTION

Field of the Invention

The invention relates to a mobile lifting column, more specifically a vehicle lifting column. In general, lifting columns are specifically used for lifting passenger cars, trucks, busses, or other vehicles and may involve a system comprising one or more moveable lifts or lifting columns, such as (mobile) lifting columns.

Description of Related Art

Conventional lifting columns comprise a frame with a carrier that is connected to a drive for moving the carrier upwards and downwards. In the ascent mode, hydraulic oil is pumped to a cylinder for lifting the carrier and, therefore, the vehicle. In the descent mode, the carrier with the vehicle is lowered and hydraulic oil returns to the reservoir. For example, such prior art lifting column is disclosed in U.S. Patent Application Publication No. 2006/0182563, which is incorporated herein by reference.

A problem with conventional lifting columns is that these columns are not always effective in a broad range of circumstances.

SUMMARY OF THE INVENTION

An object of the invention is to provide a lifting column that is easy to use and obviates or at least reduces the problems associated with conventional lifting columns.

This object is achieved with a mobile lifting column for lifting a vehicle, the column comprising:

- a frame with a moveable carrier, wherein the carrier comprises a carrier part and a guiding part with the carrier being configured for carrying the vehicle;
- a drive system which acts on the carrier and is configured for raising and/or lowering the carrier relative to the frame; and
- a lifting controller configured for controlling movement of the carrier, wherein the guiding part of the carrier comprises a U-shaped guiding part.

In the context of the present invention the carrier relates to the moving parts of the lifting column when lifting the vehicle. This carrier is driven by a drive, such as a hydraulic drive, pneumatic drive and/or electric drive. The present invention relates to mobile lifting columns, preferably wireless mobile lifting columns.

The carrier of the lifting column is capable of carrying the vehicle that needs to be lifted. The carrier moves upward and/or downward relative to the frame of the lifting column with a drive system. The carrier comprises a carrying part that is configured for carrying a vehicle, or at least a part thereof. The carrier further comprises a guiding part that enables a guiding movement relative to the frame of the lifting column. In one of the presently preferred embodiment, the drive system comprises a hydraulic cylinder drive unit that is configured for raising the carrier. This unit comprises a housing, a piston rod that is movable in the housing of the cylinder, and a hydraulic system. Alternatively, another drive system can be used, for example a pneumatic and/or electrical drive system. In one of the presently preferred embodiments of the invention the unit is embodied as an integrated hydraulic cylinder drive unit as disclosed in U.S. Patent Application Publication No. 2016/0052757.

Providing a U-shaped guiding part achieves a guiding part that is less rigid and is more flexible as compared to guiding parts and carriers of conventional lifting columns. This has the advantage that the carrier according to the invention has an improved contact surface with the frame. For example, in case the carrier is provided with a number of guiding wheels, such as 2, 3, 4, 5, 6 or more, the U-shaped guiding part enables all wheels to have an effective contact with the respective contact surfaces of the frame. In case one of such guiding wheels has no or insufficient contact with the frame during movement and/or use of the carrier, forces acting on the other guiding wheels will increase. With the U-shaped guiding part some deformation of the guiding part will occur such that the guiding wheel remains in contact with the frame. This reduces forces/loads acting on other guiding wheels due to the improved contact, for example. Furthermore, the use the U-shaped guiding part reduces the amount of material that is required for the carriers. This enables providing a cost effective mobile lifting column. In a presently preferred embodiment the carrier has four guiding wheels and the U-shaped guiding part enables all guiding wheels to remain in direct contact with the frame during movement and/or use of the carrier. In addition, less material is required for the guiding part, thereby achieving a cost effective carrier that is more stable as compared to conventional lifting columns.

Due to the improved contact between guiding wheels and frame forces acting on the carrier can be controlled more effectively. This improves the lifespan of the carrier and/or its components. In addition, this may reduce maintenance costs for the lifting column of the invention.

A further advantageous effect of the U-shaped guiding part is the reduced requirements on production accuracy. The more flexible guiding part may compensate inaccuracies to some extent.

In this description several further features are described. In some of the presently preferred embodiments of the invention these features are used or applied in combination with the U-shaped guiding part. However, these features may also be applied separately to mobile lifting columns and/or in combination with further features of the mobile lifting column, optionally without the application of the U-shaped guiding part of the carrier.

Preferably, the mobile lifting column further comprises a strain gauge and/or a pressure or load cell on or in the carrying part of the carrier. Providing a measurement device such as a strain gauge provides an additional safety measure when working with a mobile lifting column. Optionally, an RFID chip can be used in combination or as an alternative to the strain gauge.

In a preferred embodiment of the invention, the carrier comprises one or more openings for receiving a drive cylinder of the drive system. Providing one or more openings in the carrier enables an effective and efficient positioning of a drive cylinder in the lifting column. This provides a compact configuration for the mobile lifting column. Furthermore, forces acting on the cylinder and/or carrier are better aligned. This may prevent undesired (over) dimensioning of the mobile lifting column.

In a preferred embodiment of the invention the drive system further comprises one or more connectors such that the drive cylinder of the drive system can be positioned in a first configuration and a second configuration, wherein the first and second configurations have the bottom and top ends of the cylinder reversed. This provides an efficient lifting column with several mounting possibilities for the drive cylinder such that the lifting column can easily be adapted to the specific lifting requirements and/or customer's preferences.

In a preferred embodiment of the invention the lifting column further comprises a movement sensor configured for detecting a movement of the carrier. Providing a movement sensor increases the overall safety when working with the lifting column. For example, such movement sensor may detect a movement of the carrier, while the controller of the lifting column or system expects a stationary position of the carrier. Such detection is optionally fed back to the controller such that appropriate action can be taken and dangerous situations can be prevented. Such unexpected movement of a carrier could occur when a drive cylinder would be leaking, for example.

In a further preferred embodiment of the invention further comprising a control measurement system, wherein the (lifting) controller is configured for controlling movement of the carrier in response to a measurement signal from the control measurement system. Preferably, the drive system comprises a motor with an integrated motor controller.

The lifting column according to the invention preferably comprises a controller that is configured for controlling the movement, preferably including the height, of the carrier. The controller can be provided at or in the frame of the lifting column, or may in addition or as an alternative relate to a central controller capable of controlling a number of lifting columns/devices and/or several groups of lifting columns/devices, or any mixture thereof. By monitoring and controlling movements of all carriers the controller is capable of controlling the position of a vehicle that is being lift with the columns. Preferably, the controller also comprises a display and optionally other user interfaces to enable communication with the user. Also, the controller may comprise a display to improve this communication.

According to the invention, the controller comprises a control measurement system wherein the controller is configured for controlling movement of the carrier in response to a measurement signal from the control measurement system. This control measurement system is configured for indirectly and/or directly measurement of the movement of the carrier, for example height and/or displacement. This control measurement system provides information about the control actions of the drive system for the carrier and/or the height of the carrier. This provides direct and/or indirect measurement information enabling feedback on the actual position and/or displacement of the carrier.

The controller is preferably capable of receiving a measurement from a control measurement system comprising one or more sensors or sensor systems that are capable of indicating one or more of: a height of the carrier, height difference of the carrier, moving speed of the carrier, information about the control actions directed towards the drive, such as the amount of hydraulic oil sent to the drive for raising or lowering the carrier relative to the frame. In an advantageous embodiment of the invention, the control measurement system receives a measurement signal of the movement sensor, optionally as a safety measure.

This control measurement system may comprise a sensor or sensor system on the carrier or frame such as a potentiometer and/or sensors for measuring control actions and/or indirect measurement systems that may measure changes in the hydraulic system such that any measurement of a displacement of the carrier is directly available preventing time delays and, if necessary, such that appropriate control actions can be taken directly. This may improve the safety of the lifting column according to the present invention.

According to an embodiment of the invention the drive system of the lifting column comprises a motor with an integrated motor controller. This has the advantage that no additional wiring is required between the motor of the drive system and the motor controller. Preferably, the motor and the motor controller are separate parts or components that can be manufactured independently and also maintenance can be done independently. In a presently preferred embodiment the drive system of the lifting column comprises a hydraulic system. Preferably, the motor comprises a pump connection configured for directly connecting the motor to the pump of the hydraulic system of the lifting column.

In a presently preferred embodiment components of the drive system, such as the motor and the motor controller, are connected with watertight connectors. This improves the overall safety of working with the lifting system of the invention. Furthermore, the connectors connecting a first component to a second component of the drive system are mounted from below. This further improves the overall safety of working with the lifting column of the invention. This specifically reduces the risk of damage due to water penetrating the lifting column.

In a presently preferred embodiment the motor comprises a permanent-magnet (PM) motor. The permanent-magnet motor, also referred to as PM-motor, enables an effective drive for the carrier enabling raising and/or lowering the carrier relative to the frame with or without a load. As a further advantage the PM motor operates as a generator when lowering the carrier, specifically with a load resting thereon, relative to the frame. Using the motor as a generator in lowering the carrier generates electrical energy that can be used for the next lifting operation, for example. This can be advantageously applied to mobile lifting columns that rely on a battery for the lifting operation. The use of a PM motor enables a higher number of lifting operations without recharging the battery from the electrical grid and/or enables the use of a smaller battery. Therefore, the PM motor contributes to a more sustainable lifting column and/or enables more lifting operations without recharging a battery.

In a presently preferred embodiment the drive system comprises a hydraulic system having a hydraulic reservoir, wherein the reservoir extends over a substantial height of the frame.

Providing a hydraulic system for the drive system gives a reliable and robust lifting column. Providing an extended reservoir with having a height that extends over a substantial height of the frame enables a compact design of the lifting column. This contributes to easy installation of the lifting column and/or easy displacement and positioning of a mobile lifting column. Preferably, the height of the reservoir is significantly higher as compared to the width and/or depth of the reservoir. In use, the height of the reservoir extends in a substantial vertical direction, while the depth and width of the reservoir are in a substantially horizontal plane. Preferably, the height of the extended reservoir is more than twice the size of the width and/or depth of the reservoir, more preferably the ratio of the height of the reservoir and the size of the width or depth is above 3, even more preferably above 5, and most preferably above 7. As an advantageous effect, in an optional embodiment of the invention a level sensor is provided in the reservoir. The increased height of the extended reservoir increases the accuracy of measuring changes in the oil volume.

In a presently preferred embodiment the pump of the hydraulic system is positioned below the reservoir. This assures that hydraulic oil is at all circumstances provided from the reservoir to the pump without requiring additional piping or tubing.

In one of the presently preferred embodiments of the invention, the control measurement system comprises a sensor configured for generating the measurement signal for determining a control action with the controller related to the drive system of the lifting column, with the sensor configured for generating an indirect measurement signal from the hydraulic system.

Using direct (control) information about the control actions of the drive system enables taking fast control actions without unnecessary time delays. This improves the overall control performance of the lifting column of the invention. The direct (control) information relates to information about the hydraulic system, for example the amount of hydraulic oil sent to the drive for raising or lowering the carrier relative to the frame.

As a further advantage, the indirect measurement in the hydraulic system provides an explosion proof measurement system. This further improves the overall safety of lifting systems for lifting a vehicle.

In addition, providing an indirect measurement based on the hydraulic system, preferably measuring changes in the hydraulic system, enables a detection of any leakage of hydraulic fluid from the system. This improves the environmental performance of the lifting system. Furthermore, the measurement can be compared with the theoretical changes of the hydraulic system by comparing with the motor RPM thereby further enabling and/or improving a detection of any leakage. Furthermore, such comparison may provide an indication of wear of components of the system. This may provide an accurate indication of required preventive maintenance.

In an embodiment of the present invention, the measurement system comprises a sensor that is contained inside the hydraulic system, for example in the hydraulic reservoir and/or in the hydraulic connections, such as pipes or tubes. This provides a stable environment for the sensor or sensor components. This reduces the risk of fouling or temperature fluctuations that may influence the measurements. Therefore, this contributes to the accuracy and robustness of the measurement system in such embodiment, as was already mentioned earlier herein in relation to the extended reservoir.

In such preferred embodiment the lifting system comprises a control measuring system that is configured for indirectly measuring the height and/or displacement of the carrier through the use of a measurement of the hydraulic system. The use of this measuring system provides information about movement and/or height of the carrier. This measuring system provides an indirect measurement enabling feedback on the actual displacement of the carrier. This obviates the need for separate sensor systems on the carrier or frame, such as a potentiometer, thereby reducing the complexity of the lifting column, and reducing the risk of additional noise or disturbances influencing measurement signals and/or communication between the different components of the lifting column. This improves the accuracy and/or robustness of the measurement system.

Furthermore, as the measurement of the control measurement system is based on (a change) in the hydraulic system any measurement of a displacement is directly available such that there is no time delay and, if necessary, appropriate control actions can be taken directly. This improves the safety of the lifting column according to the present invention.

In one of the preferred embodiment of the invention the sensor of the control measurement system is configured for measuring the level, pressure, or volume of the hydraulic liquid and/or the change thereof. More specifically, in such embodiment of the invention, the measurement system preferably comprises a sensor that is contained inside the hydraulic system, for example in the hydraulic reservoir and/or in the hydraulic connections, such as pipes or tubes.

By measuring the level or volume of the hydraulic liquid in the reservoir, or a change thereof, the measurement signal is indicative for the amount of hydraulic liquid that is provided towards the drive, such as a cylinder, that moves the carrier is achieved. This provides indirect measurement information about the height of the carrier or change thereof, even before actual displacement of the carrier takes place. In fact, this provides measurement information about the control actions of the drive system. This achieves the aforementioned effects and advantages. It will be understood that the level indication of the hydraulic liquid in the reservoir relates to the amount of hydraulic liquid that is provided to and/or received from the drive. It will be understood that any shape of the reservoir can be compensated for. Therefore, this contributes to the accuracy and robustness of the measurement system in such embodiment, as was already mentioned earlier herein in relation to the extended reservoir.

The sensor preferably comprises one or more of the following sensors: an ultrasonic hydraulic liquid level sensor, a float sensor configured for measuring the hydraulic liquid level, a pressure sensor configured for measuring pressure and/or pressure differences in the reservoir. These sensors have the further advantage that long cables that are connected to a moving carrier can be omitted from the lifting column as compared to a sensor that is mounted to the moveable carrier, such as a potentiometer. This provides an effective system without unnecessary complexity.

An ultrasonic sensor can be provided above the hydraulic liquid level to measure a distance from the reference point of the sensor to this surface level. Any change of this distance indicates a movement of the carrier and a change of the height of the carrier of the lifting system. Preferably, the sensor is mounted at the top of the reservoir, preferably a reservoir with an extended and/or substantial height. The ultrasonic sensor, also referred to as ultrasound sensor, sends a signal that is reflected from the oil level in the reservoir. The preferred extended height of the reservoir contributes to an effective measurement and more specifically contributes to providing a more accurate measurement signal. In a presently preferred embodiment the reservoir is designed such that there is a ratio between a height change of the carrier and the oil level that is between 1:1 and 1:10, preferably between 1:2 and 1:5, and is most preferably about 1:3. A ratio of 1:3 means that a height change of the carrier of 3 mm corresponds to a change in oil level in the reservoir of 1 mm. This provides an accurate measurement. In this embodiment, preferably the pump is mounted below the reservoir. This obviates the need for additional piping or tubing. This has the additional advantage that the risk of disturbances acting on the measurement is further reduced.

In a similar way, a float sensor can be implemented as an alternative or in addition to the ultrasonic sensor. Such float sensor may comprise an electromagnetic float and/or resistance element and/or an inclinometer. This provides a direct measurement of any change of the level of the hydraulic liquid surface.

A pressure sensor can be applied to measure and pressure differences in response to a change in the volume of the hydraulic liquid in the reservoir. This may involve providing a pressure sensor in the room or chamber above the hydraulic liquid surface and/or providing a pressure sensor in a separate measurement tube that is connected to the hydraulic reservoir and/or a weight measurement of the hydraulic liquid that is contained in the reservoir.

In addition to the aforementioned sensor types, or as an alternative thereto, a flow sensor can be provided in the hydraulic liquid pipe or tube between the reservoir and the drive. The drive may relate to components such as the hydraulic pump of the drive and/or hydraulic cylinder of the drive. Such flow sensor provides an accurate measurement of the amount of hydraulic liquid that is transferred between the reservoir and the drive unit.

In some of the embodiments of the invention one or more additional sensors can be provided to improve the accuracy of the measurement. For example, a temperature sensor can be provided at or close to the location of the sensor of the measurement system to enable temperature correction of the measurement signal. Also, a movement sensor as mentioned earlier herein can be provided. These additional sensor(s) further improve(s) the overall accuracy of the measurement information.

In a further preferred embodiment according to the invention the drive comprises a reservoir with a submerged pump. By providing a submerged pump a compact and effective hydraulic circuit is achieved with a significant reduction of the number of hoses and connections. This further reduces the risk of hydraulic fluid, such as hydraulic oil, leaking from the lifting system. In addition, the amount of hydraulic liquid that is required for a lifting system is further reduced.

Furthermore, the lifting column/device according to the present invention preferably comprises an integrated hydraulic fluid tank and motor unit. Integrating the hydraulic fluid tank and motor in one unit reduces the need for space required for these components in the lifting column and enables a relatively compact construction. Such compact construction significantly reduces the number and/or length of hoses and other connections between the individual units or components of the lifting column according to the present invention. This renders the lifting column according to the invention more cost effective and, in addition, reduces the risk of failure of components and/or connections. In particular, the risk of hydraulic fluid leaking from a connection is reduced significantly.

In a further presently preferred embodiment of the invention the drive system comprises an integrated hydraulic cylinder drive unit that is configured for raising the carrier. This unit comprises, in an integrated manner, a housing, a piston rod that is movable in the housing of the cylinder, and a piston rod displacement measuring system that is configured for measuring the displacement of the piston rod.

The use of this piston rod displacement measuring system enables the direct measurement of a displacement of the piston rod that is directly related to the height of the carrier. This provides a direct (control) measurement enabling direct feedback on the actual displacement of the carrier. This obviates the need for separate sensor systems, thereby reducing the complexity of the lifting column, and reducing the risk of additional noise or disturbances on measurement signals and/or communication between the different components of the lifting column. Furthermore, as the height measurement can be performed directly on the displacement of the piston rod the feedback of the displacement is directly available to the controller such that there is no time delay and, if necessary, appropriate control actions can be taken directly. This improves the safety of the lifting column according to the present invention.

Providing a sensor code directly on the piston rod enables a direct measurement of the displacement of this piston rod by providing a sensing element. This sensing element is configured for reading the sensor code to determine the displacement. This enables a direct measurement of the displacement of the piston rod and, therefore, the movement and/or location of the carrier of the lifting column.

In a presently preferred embodiment the sensor code is a magnetic code. The piston rod acts as host for the sensor code and is preferably of a steel material. The sensing element is preferably a row of magnetic field sensors which are located in the proximity of the sensor code. The use of such configuration enables measuring changes in the magnetic field(s) caused by displacement of the piston rod such that the sensing element, for example embodied as coils, respond to the magnetic field changes. This provides a measurement of the actual displacement of the piston rod and therefore of the height of the carrier of the lifting column. The measurement signal can be supplied to a lifting column controller that monitors and controls the height of the carrier. If required, the lifting column controller may compare the height of an individual carrier with heights of other carriers and determine corrective action, if necessary. Such corrective action may involve raising or lowering individual carriers in addition to the original steering command.

Optionally, embodiments of the lifting system of the invention comprise a locking system for locking the carrier at a desired height and/or submersible pump as is disclosed in U.S. Ser. No. 14/791,644, for example, which is incorporated herein by reference.

In a presently preferred embodiment of the invention the drive system of the lifting column further comprises an energy supply with a battery.

By providing a battery, the lifting column/device may relate to a so-called stand-alone lifting column/device, more specifically a mobile lifting column. These mobile lifting columns can be wired or wireless. In one of the preferred embodiments the energy supply comprises at least two batteries. This provides additional flexibility as, preferably, the batteries can be charged and/or replaced independently from each other. Also, the use of two or more batteries enables providing a worldwide applicable lifting column capable of dealing with different voltages including 120/240 VHC 50/60 Hz by adapting the actual circuit of the batteries to the relevant national standard.

Also preferably, the lifting column comprises a charging device. More preferably, the charging device comprises separate charging circuits for the different batteries, preferably at least two 12 V batteries that can be charged independently. This enables optimal charging of the batteries and enables independent replacement. The charging device is preferably included in the frame of the lifting column thereby providing a watertight configuration, for example an IP68 watertight configuration.

Preferably, the one or more batteries are provided in or at the frame at a position below the drive system. This specific configuration enables a compact design of the lifting column. Furthermore, the center of gravity is at a lower position as compared to conventional lifting columns. This improves the overall stability of the lifting column according to the invention.

Also preferably, the controller comprises a charging monitor that is configured for monitoring the regenerative charging process when lowering a load. This charging of the batteries when lowering a load increases the number of lifting cycles that can be performed between charging operations of the battery.

Preferably the charging monitor provides the user with information on a display or other suitable means. In a presently preferred embodiment the column comprises a so-called light pipe element configured for indicating a battery status. This status includes the actual mode of the battery, i.e. is the battery being charged or not. Optionally, the lifting column according to the invention comprises a feeder cable drum configured for charging a battery and/or accessories of the lifting column.

The controller further preferably comprises a resistance and a switch circuit that are operatively connected to the charging monitor and capable of preventing overcharging of the one or more batteries. This provides a safety measure preventing overcharging the batteries. In case the batteries are full and the load is lowered the generated energy is provided to the resistance with a switch circuit to prevent this overloading. This improves the reliability and robustness of the lifting system of the invention.

As an alternative to the switch circuit with the separate resistance the lowering of the carrier can be done with a reduced velocity to prevent regenerating of energy, in case the charging monitor detects that batteries are completely full.

By integrating the charging device and charging monitor in the frame of the lifting column a compact design is achieved that is robust and less sensitive to disturbances and fouling as compared to conventional lifting columns. This improves the overall functioning of the lifting column of the invention.

In a further preferred embodiment of the invention the frame comprises a foot having a tapering part with an additional running wheel at or near the front of the foot of the frame.

By providing the foot with a tapering part the overall stability of the lifting column is improved. The tapering part has the highest thickness or height close to the mast of the frame. This improves the overall strength and stability without increasing the amount of material that is required for stable positioning of the lifting column. This is particularly advantageous for mobile lifting columns.

Preferably, the frame of the lifting column comprises a modular cartridge containing an additional running wheel at or near the front of a foot of the frame. It is noted that this additional wheel is additional to the wheel located at the carrier side of the column. In conventional lifting columns this additional wheel is a conventional stationary wheel. The cartridge with wheel provides an effective means for positioning or displacing lifting systems, in particular mobile lifting columns. In addition, the cartridge enables effective assembly and maintenance of the running wheel.

In a further preferred embodiment of the invention the controller of the lifting column comprises a connectivity module configured for communicating with an external system.

By providing the controller with a connectivity module the lifting column may communicate with external systems such as a counting, maintenance, logistics, planning. Also, this module may be used when communicating with a central controller in case the lifting column is part of a wider lifting system. Further examples of systems with such connectivity module are illustrated herein in relation to further embodiments.

In a presently preferred embodiment the mobile lifting column according to the invention further comprises a locking system for locking and unlocking the moveable carrier relative to the frame, wherein the locking system comprises:

- a lock actuator and a locking rail that both extend over at least a part of the height of the frame;
- a locking drive configured for moving the lock actuator between a locked state and an unlocked state; and
- a lock that is provided at or on the moveable carrier and is configured for engaging and/or disengaging the locking rail in response to a movement of the lock actuator.

The locking system of the lifting column of the present invention comprises a lock activator and a locking rail. Both extend over at least a part of the height of the frame. The locking system further comprises a locking drive configured for moving the lock actuator between a locked state and an unlocked state, and a lock that is provided at or on the moveable carrier and is configured for engaging and/or disengaging the locking rail in response to the movement of the actuator. Preferably, the lock is provided at the guiding part of the moveable carrier.

Providing the lock at the carrier enables a reduction of the height of the guiding part of the carrier. This significantly reduces the amount of material that is required for the carrier. Therefore, the overall weight of the carrier is significantly reduced without influencing the performance of the lifting column. This reduces manufacturing costs, improves operational efficiency when working with the lifting column of the present invention, and may also reduce transportation costs. In one of the presently preferred embodiments the weight reduction is enhanced by the use of the U-shaped guiding part of the carrier.

As a further advantage of the locking system according to the present invention, the carrier can be locked at any desired position along the frame of the lifting column. This significantly reduces the locking pitch that is present in conventional lifting columns. It also contributes to a safe and user friendly operation of the lifting column in one of the embodiments of the present invention.

In a presently preferred embodiment of the invention the lock preferably comprises a pawl, lock, block, pen or rod-like element that moves to and from the locking rail that is attached or provided in the frame when engaging or disengaging the carrier. Preferably, the locking rail comprises a number of teeth shaped like a gear rack that extends over a substantial part of the height of the frame.

Activating the lock with a lock actuator and a locking drive that are configured for moving the lock actuator between a locked state and an unlocked state enables the lock to engage or disengage the locking rail. The lock actuator preferably extends over a substantial part of the height of the frame, wherein the height of the frame preferably substantially corresponds to the height of the locking rail. The use of the lock actuator has the advantage that no communication cables or power supply needs to be provided to the moveable carrier. By obviating the need for providing such cables or connections a robust lifting column is achieved.

In a presently preferred embodiment of the invention the lock actuator is embodied as a strip or rod or rail or vane that is configured for steering the lock. In such embodiment this mechanical lock actuator provides a reliable and robust locking system that can be manufactured at relatively low cost.

In one of the presently preferred embodiments of the invention the lock actuator is configured such that the locking system moves to the locked state in case of a power failure, for example a hydraulic, pneumatic or electric power failure. This improves the overall safety when working with the lifting column of the invention.

The lock actuator and locking rail are preferably provided in or at the frame. This reduces fouling and the risk of damaging these parts during operation of the lifting column. This guarantees a robust and effective operation of the locking system. Also, in one of the preferred embodiments of the invention the locking actuator is provided in a frame with a connection such that the locking actuator may rotate around its axis when moving between the locked and unlocked state. Such rotational movement enables an effective control of the lock.

In a presently preferred embodiment of the invention the lock comprises a locking mechanism that further comprises a rod extending between the lock and the carrier.

Providing a locking mechanism enables an effective operation of the lock. Optionally, the rod enables manual control of the locking system. For example, this enables manual disengagement of the lock from the locking rail, also in case of a power failure.

Preferably, the rod is connected to the carrier with a hinged connection and substantially extends in a vertical direction. Even more preferably, the hinged connection is configured such that it automatically moves the lock in the locked state when the actuator is not activated. This achieves a safe working environment when working with the lifting column that is also safe in case of a power failure, as was described earlier in this description.

In a further preferred embodiment of the invention the locking actuator comprises a locking frame and an anti-wear strip extending over substantially the length of the locking actuator.

Providing the locking actuator with a locking frame and an anti-wear strip prevents or at least reduces wear of the lock actuator when the pawl or locking element of the lock moves along the lock actuator. This reduces wear and reduces the risk of malfunctioning of the lifting column.

Preferably, the locking frame comprises a light-weight material, more preferably aluminium. This further improves the overall weight of the locking system and the lifting column provided therewith. Furthermore, the anti-wear strip comprises polyethylene or a similar wear-reducing material.

In one of the presently preferred embodiments of the invention the ratio of the length of the guiding part of the carrier and the length of the frame of the lifting column is below 0.5, preferably below 0.4, and most preferably below 0.3.

While in conventional lifting columns the length of the guiding part of the carrier is more or less similar to the height (also referred to as frame length) of the frame, the use of the locking system according to the present invention enables a reduction in the length of the guiding part of the carrier. This length of the guiding part can be significantly smaller than the length of the frame. Most preferably, the length of the guiding part of the carrier is below 0.3 of the length (also referred to as height) of the frame. This significantly reduces the amount of material required for the guiding part and, therefore, the overall weight of the lifting column.

Optionally, the lock is monitored and/or (partially) controlled with a further (external) system using the aforementioned connectivity module.

In a further preferred embodiment of the invention the mobile lifting column further comprises a displacement mechanism configured for positioning the lifting column, wherein the displacement mechanism comprises:

- a displacement frame comprising a housing, and a wheel that is provided at a first end of the housing, wherein the wheel is moveable relative to the frame between a displacement position wherein the lifting column can be displaced and a stationary position wherein the lifting column is in a stationary position;
- a counter force element that is providing in or on the frame; and
- a steering handle that is operatively coupled to the wheel with a linkage mechanism that is configured for moving the wheel relative to the frame, and wherein the steering handle is connected to the displacement frame at a second end of the housing.

According to the invention the displacement mechanism of the lifting column is configured for positioning/displacing the lifting column and comprises a frame and a moveable wheel. More specifically, the wheel can be moved relative to the frame in a substantial vertical direction between a displacement position and a stationary position. In the stationary position the lifting column rests with its foot and/or other frame part on the ground surface thereby providing a stable configuration for lifting the vehicle. The displacement mechanism further comprises a counter force element that is provided in or on the displacement frame. In its presently preferred embodiment of the invention the counter force element pushes the wheel downward relative to the displacement frame. Preferably, the counter force is such that, in case the mobile lifting column carries a vehicle, the forces acting on the displacement frame are such that the displacement frame moves relative to the wheel against the action of the counter force and moves the displacement frame to its stationary position. This guarantees a safe working environment preventing injuries and/or damage to the column or its surroundings.

Furthermore, the displacement mechanism comprises a steering handle that is operatively coupled to the wheel with a linkage mechanism. The linking mechanism is configured for moving the wheel relative to the frame. This improves ease of positioning or displacing the mobile lifting column. According to the invention the steering handle is connected to the displacement frame at a second end or side of the housing, while the wheel is provided at the first end or side of the housing. More specifically, with the displacement frame having a part extending in a substantially vertical direction, the first end or side of the housing is at or near the bottom side of the displacement frame and the second end or side of the housing is at or near the upper side of the displacement frame. This specific position for the steering handle improves positioning or displacing the column. More specifically, this position reduces the amount of space that is required when positioning/displacing the mobile lifting column of the invention. Furthermore, this reduces the risk of causing damage to the column or its direct surroundings.

As a further effect, the steering handle according to the invention also reduces the risk of an operator hand getting jammed or wedged between the displacement frame and the other parts of the frame of the mobile lifting column. This further improves working with the mobile column of the invention.

Providing the counter force element achieves an effective counter force acting on the wheel of the mobile lifting column. The element is configured such that, without a load acting on the lifting column, the force is such that the frame of the mobile lifting column can be positioned/displaced. The element is also configured such that, when a load such as a vehicle is carried by the mobile lifting column, this load exceeds the counter force such that the frame of the mobile lifting column rests on the ground surface of the workshop, for example. This achieves a safe working environment by preventing that mobile column rolling away from its position when lifting a vehicle.

In a presently preferred embodiment the counterforce element is a spring element substantially extending along a displacement frame axis between the wheel and the steering handle.

Providing the counter force element as a spring element achieves an effective embodiment of the invention to provide the save working environment.

Preferably, the counter force is adjustable between 1000 and 10000 N, more preferably between 1500 and 7500 N, and most preferably between 2000 and 6000 N. These counterforces appear to be appropriate for providing a mobile lifting column that is easy to handle and displace, and also provides a safe working environment.

Preferably, the counterforce is adjustable. By providing an adjustable counterforce the mobile lifting column is flexible in application with different types of lifting columns. This provides a more generic displacement mechanism that can be applied when lifting different vehicle types, such as trucks or passenger cars. This improves the operational flexibility of the mobile lifting column according to the present invention.

In a presently preferred embodiment the spring element extends with its axis along the axis of the displacement frame. Preferably, the spring element is provided over a substantial part of this axis that preferably connects the wheel and the steering handle. Therefore, in this embodiment the spring element extends between the opposite ends of the housing of the displacement frame. This provides an effective counter force element involving a limited number of parts and is mounted in a (semi-) closed environment. This prevents fouling and malfunctioning of the counter force element. This provides a robust mobile lifting column.

In a further presently preferred embodiment of the invention the linkage mechanism comprises a rod that extends between the wheel at the first end or side of the housing and the handle at the second end or side of the housing, and is furthermore connected to the handle.

Providing a linkage mechanism achieves an effective displacement mechanism. More specifically, by providing the handle at the opposite end of the housing of the displacement mechanism as the wheel, an effective displacement/positioning of the mobile lifting column is made possible. Preferably, the rod acts as axis or shaft of the housing of the displacement mechanism. This provides a robust and stable displacement mechanism.

Preferably, the handle is pivotally connected to the housing at a hinge. The displacement mechanism further preferably comprises a lever or balance with a linkage mechanism being pivotally connected to the lever or balance. This enables easy handling of the displacement mechanism, more specifically easy moving of the wheel between the displacement position and the stationary position. In a presently preferred embodiment the handle itself acts as lever or balance. This achieves an effective displacement mechanism. In a presently preferred embodiment of the invention, the lifting column further comprises a damping element that is configured for damping the movement of the steering handle when moving the lifting column from a stationary position wherein the lifting column is in a stationary (parking) position to a displacement position wherein the lifting column can be displaced. The damper (shock absorber) preferably comprises an oil damper and/or is preferably provided below the handle. This damping element prevents the handle moving upwards too fast with the risk of injuring a user, for example. Preferably, when moving the handle in the other direction the damping element is not functional such that the transfer into the stationary position is not hindered. Alternatively, or in addition thereto, the displacement mechanism comprises an overcenter linkage. Such overcenter linkage is a mechanical stop in the linkage to prevent any "back driving" of such mechanism. The movement of the handle to position the wheel is held by the overcenter mechanism to provide a stable position and thereby a safe working environment.

In a preferred embodiment of the invention the displacement mechanism further comprises a position sensor that is configured for detecting the position of the displacement system.

By providing a position sensor an additional safety measure is provided that detects the actual position, more specifically the actual status, of the displacement system. More particularly, it detects the position of the wheel relative to the displacement frame. Preferably, the use of this position sensor provides a detection of the actual position in addition to the visual inspection of the position of the handle. This improves the safety when working with the lifting column of the invention.

Preferably, the sensor comprises an induction detector that is provided in or on the housing of the displacement mechanism. Preferably, in such embodiment, the sensor further comprises metal bush or profile that moves with the wheel relative to the housing and the detector when moving the wheel between the displacement and stationary positions. This achieves an effective detection of the actual position of the displacement mechanism. This detection is preferably coupled to the controller of the mobile lifting column such that the actual detection may block and/or authorize further operation with the mobile lifting column. This contributes to providing a safe working environment. Optionally, the connectivity module is used to co-operate with further (external) systems, for example for authorizing a displacement of the lifting column.

In a further preferred embodiment the controller comprises a displacement mode that is directly or indirectly activated by the position detector and/or lifting column position detector detecting an intended displacement of the lifting column. This provides an additional safety measure to prevent undesired movement of the lifting column.

In a further preferred embodiment the lifting column and/or group of lifting columns comprises an indoor positioning detector configured for detecting an absolute and/or relative position of the lifting column. Preferably, the lifting column or group of lifting columns comprises a controller with an indoor positioning system that comprise such detector. Such indoor positioning system is capable of communicating with one or more transponders, also referred to as transmitter and responder. The transponder transmits a message in response to a received message. The indoor positioning system is capable of locating the lifting column, and more specifically the carrier of the lifting column, inside a building, using radio waves, magnetic fields, acoustic signals or other means of transferring information. Possibly, a combination of signals can be applied. With the use of optical, radio or acoustic technologies, or other convenient technologies, the position and height of the carrier can be determined. Preferably, at least three independent measurements are used by the control system to determine the location and height of the carrier involving the use of trilateration. The transponders may relate to so-called active transponders that are provided with an energy supply such as a battery or power supply. Also, transponders may relate to so-called passive transponders that receive the required energy from the received signal. An indoor positioning system using wi-fi signals is also referred to as a wi-fi-based positioning system. Also, blue tooth and other signals can be used in addition or as an alternative. Alternatively, or in combination with the aforementioned active and/or passive transponders, other devices acting as transponder can be applied. In the context of the present invention a transponder is a device that is capable of generating or forwarding a signal indicative for its location (and height), preferably in response to an interrogating (received) signal.

By providing the transponder on or at the carrier, both location and height of the carrier can be determined with the indoor positioning system of the controller. This obviates the need for separate height sensors, as the transponder can be used for both location determination and for height measurement of the carrier during the lifting operation. This renders the lifting column and/or group of lifting columns less complex. Location of lifting devices is used when selecting lifting columns for a lifting system. This specifically relates to mobile lifting column, for example.

The displacement mode and/or indoor position detector are optionally used in combination with an external network or system, for example using the connectivity module.

In a further preferred embodiment of the mobile lifting column according to the invention the lifting column further comprises:

- a movement and/or height sensing system that is configured for directly and/or indirectly measuring the movement and/or height of the carrier;
- a locking mechanism for mechanically locking the carrier at a desired height comprising a moveable locking element capable of locking and unlocking the carrier, wherein the locking mechanism comprises a lock sensor for measuring the position of the locking element.

By providing a movement and/or height sensing system the movement and/or height of the carrier relative to the frame and/or ground surface can be detected/measured. This measurement can be done directly with a pull wire potentiometer or alternatively with a laser sensor or indirectly with an ultrasonic oil level sensor in the tank of the hydraulic system. It will be understood that other movement and/or height measuring or sensing systems can also be used.

The mechanical locking mechanism locks the carrier at a desired height to provide a safe working environment. In a presently preferred embodiment such mechanism involves a safety ratchet device having a series of successive stop elements in the longitudinal direction of the frame that define a lock or stop surface, and a locking element to which is also referred to as a ratchet element, that may come into contact with a stop element in a locking position. In an unlocking or retracted position the stop elements can pass freely relative to the locking element. The locking element can be activated after the carrier or carriers of the lifting column or columns have reached the desired height. In a presently preferred embodiment the locking element comprises a locking pawl. Such pawl provides a stable and robust locking element.

According to the invention the locking mechanism comprises a lock sensor for measuring the position of the locking element. By directly measuring the actual position of the locking element the locking or unlocking state of the mechanism is determined directly. This provides a safe locking mechanism that provides safety indications correctly under a much broader range of operating conditions as compared to conventional mechanisms. For example, when using axle stands the load is actually removed or at least its weight is largely reduced from the carrier or carriers and the load is moved to the stands. This may give a lifting controller the impression that the load is safely supported by the locking mechanism, such that a safe working environment is achieved. This is not necessarily true and depends on the axle stands, for example. In a worse case scenario, this may even result in accidents due to the false detection of a safe working environment. Providing a direct lock sensor that directly measures the actual position of the locking element enables a direct detection of the actual status of the locking mechanism. This obviates any false detections such that a safe working environment can be achieved. This improves the overall safety of working with a lifting column for lifting a vehicle.

The lock sensor preferably comprises a position indicator that may operate (electro) mechanically, inductive or optically. It will be understood that different types of lock sensors can be applied for the direct measurement of the actual position of the locking element.

In a preferred embodiment of the invention the sensor is connected with a connector to the control system of the lifting column, so that the actual status of the lock sensor can be indicated on the control panel, preferably on a display thereof.

By providing a display, an operator of the lifting column is provided with an overview of the actual status of the lifting column, more specifically in relation to the actual position of the locking element. The display can be one or more of a display of the lifting column such as a touch screen, a display on a remote control, or a central display that is capable of visualising the status of locking elements of different lifting columns.

Visualisation of the actual status of the locking elements or unlocking elements can be done in various ways. For example, a green screen or green element can be displayed when the locking element or locking elements are in the locking position, such that all the carriers are supported by the locking element, such as the locking pawl. In presently preferred embodiments this means that the lifting column or lifting system has reached its desired height and the carriers are brought into a position that a mechanical locking system is activated, for example by a user. In the visualisation a red background colour or element may indicate that the locking element or pawl is inactive and is in a retracted position. In an intermediate situation, the background colour or element colour can be orange indicating that the locking element or pawl is in an active locking state, however, the locking pawl is not yet activated in this state. Optionally, in addition, visualization may also use a light element attached or connected to the lifting column or at another location, for example centrally in the work place. Furthermore, in addition to any visual indication, also a sound signal can be used to improve the message or signal to the operator. Furthermore, in addition or as an alternative to the sound signal, a signal can be provided to a supervisor to enable this supervisor to check that working conditions are safe.

In a further preferred embodiment of the invention the lifting column further comprises a controller that is connected to the lock sensor and is configured to enable and or disable the operation of the lifting column based on a signal received from the lock sensor. Optionally, the controller is connected to an external network or system using the connectivity module. For example, this enables authorization of any disablement of the lock.

By providing the controller with the measurement signal from the lock sensor the controller is capable of detecting a safe or unsafe situation. The controller may provide warning signals and may also enable and/or disable operation of the lifting column or lifting system as a whole. This contributes to the safety of the working environment.

In one of the preferred embodiments the controller further comprises a warning system that is configured for comprising a warning signal and/or control signal in response to a detected and unsafe situation. This further improves the overall safety when working with a lifting column or lifting system.

In a further preferred embodiment of the invention the lifting column comprises a vehicle detector. By providing such vehicle detector the lifting column is capable of detecting the presence of a vehicle. This can be used by a controller, for example, and may improve the overall safety when working with a lifting column or lifting system.

In a further preferred embodiment of the invention the mobile lifting column further comprises:

- a moving system for changing the position of the mobile lifting column, comprising:
- a number of front wheels;
- a number of rear wheels;
- a column drive configured for moving the mobile lifting column; and
- a power system configured for providing power to at least the column drive.

Such moving and power systems are disclosed in NL 2013152 that is incorporated herein by reference. It is noted that the umber of front and/or rear wheels can be 1, 2, 3, 4 or any other suitable number. The moving system according to the invention comprises a number of front wheels including an embodiment with two separate front wheels, a number of rear wheels including an embodiment with one single or double rear wheel, and a column drive configured for moving the lifting column. The front wheels and rear wheels of the lifting column may relate to conventional wheels of a mobile lifting column and/or custom-made wheels for the mobile lifting column according to the present invention. The column drive is configured for moving the lifting column to another position. When activated the column drive moves the column by driving one or more of the wheels of the column. Preferably the column drive acts on one or more of the regular wheels of the column. Alternatively, the column drive acts on an additional side wheel. Furthermore, the mobile lifting column comprises a power system that is configured for providing power to at least the column drive. The use of power from this power system obviates the need for the user to apply significant force when repositioning the mobile lifting column. Such repositioning of mobile lifting columns is required in between different lifting operations on different vehicles, for example. Providing the column drive with the power system provides a non-human powered moving system for changing the position of the mobile lifting column in a workshop for example. This renders the mobile lifting column easy to use. Furthermore, this renders it less cumbersome for the user to park unneeded mobile lifting columns at a prescribed location. Furthermore, it assures that the user selects the most optimal mobile lifting column for the next lifting operation without restricting himself to the lifting columns that are most near. This improves the overall flexibility of the mobile lifting column according to the present invention and improves the overall efficiency of lifting operations.

In a further preferred embodiment of the invention the controller of the mobile lifting column comprises:

- a first processor configured for controlling movement of one or more of the carriers of one or more lifting columns;
- a second processor configured for sending and/or receiving instructions between a user interface and the controller;
- a confirmation element enabling the user to confirm adjusted settings of the lifting column and/or an instruction.

A first processor is used for the control of the lifting column and/or a lifting system comprising such lifting column. A second processor is used for communication with a user, maintenance system/center, financial department etc. To provide additional safety a confirmation element is provided to enable the user to confirm adjusted settings of the lifting column and/or an (control) instruction. Optionally, all settings and/or instruction need a confirmation. However, in a preferred embodiment only the most relevant settings and/or instructions require such confirmation. The confirmation is preferably done by manual confirmation that is not automated. Optionally, this confirmation may require pushing or touching a button, switch, pawl etc.

It will be understood that several combination of features can be made to provide further embodiments of the mobile lifting column. This may include embodiment with (combinations of) further features without the U-shaped guiding part of the carrier. Optionally, other features for a mobile lifting column and/or system may also be applied in combination with one or more of the features described here. For example, such other features may relate to superimposed communication with power line communication as disclosed in WO 2017/010879 A1, indoor positioning determining the location and height of the carrier as disclosed in US 2017/0088405 A1, indirect height measurement as disclosed in WO 2017/007311 A1, with all documents being incorporated herein by reference.

The invention further relates to a lifting system for lifting a vehicle, the system comprising a number of mobile lifting columns as described herein.

The lifting system provides the same or similar effects and/or advantages as described for the mobile lifting column.

The individual lifting devices/columns can be controlled by a central controller of the lifting system, for example.

Preferably, a number of lifting columns, more specifically a number of (mobile) lifting columns can be grouped together as a lifting system. In an embodiment of such a lifting system according to the invention, when lifting a vehicle, at least two lifting columns are being used. In fact, in practice often four lifting columns are being used. During such lifting operation, the timing of these separate lifting columns including the moving speed of the carrier that carries (part of) the vehicle when lifting a vehicle, requires synchronization. The control of the lifting system preferably comprises a system controller that synchronizes the height of the separate carriers in the ascent mode using, for example, a measurement signal generated by a height sensor, for example a potentiometer, and/or more preferably a measurement signal generated by the control measurement system according to a presently preferred embodiment of the present invention. Of course, other sensors can also be used.

In case one of the carriers has moved too fast in the ascent mode and is too high as compared to the other carriers of the other lifting columns, for example the power supply to this carrier is either directly or indirectly lowered so that the other carriers can catch up or, alternatively, the power supply to the other carriers is either directly or indirectly increased so that the other carriers can catch up. In the descent mode, it is also important that the height of the carriers between the several lifting columns is synchronized. Therefore, in case one of these carriers has moved too slowly, for example its power supply is increased in order for this carrier to catch up with the other carriers or, alternatively, the power supply to the other carriers is either directly or indirectly lowered so that the other carriers can catch up.

In a further preferred embodiment of the invention the lifting system comprises a central controller for centrally controlling the one or more lifting columns, the central controller comprising:

- a transmitter/receiver for communication with individual lifting columns;
- computing means, such as a processor, for determining required control actions for individual lifting columns; and
- wherein at least one of the central controller or at least one of the lifting columns comprises user input means configured for providing the central controller with input.

The central controller determines and communicates required control actions to the individual lifting columns. The central controller uses computing means, such as a processor, to determine the required and/or desired control actions. This may involve comparing movement and/or height measurements from different lifting columns and calculating a corrective action, if necessary. The central controller is preferably positioned such that all communication between an individual lifting column and the central controller has a minimum risk of being disturbed. This contributes to a safe and robust operation with the lifting columns. For example, the central controller can be positioned above the group of lifting columns it is controlling. This may involve attaching the central controller to a ceiling of the workshop, for example.

A further advantage of working with a central controller is that it is not required to provide individual lifting columns with computing means. This reduces the complexity and associated costs of the individual lifting columns.

In an embodiment according to the invention the central controller is used to control a group of selected lifting columns. In case of moveable lifting columns such selection can be made in a manner known to the skilled person, for example as described in U.S. Pat. No. 7,500,816, which is incorporated herein by reference. The selection of individual lifting columns may involve the use of a key or card.

In a further embodiment according to the invention the central controller is capable of controlling multiple groups of selected lifting columns, such as two, three, four or more. This renders the use of a central controller further cost effective. For example, a work shop with a number of moveable lifting columns may involve a changing number of groups of a varying number of selected lifting columns. Different groups can be controlled with a single central controller. By improving communication between a central controller and individual lifting columns enhances possibilities for controlling multiple groups of selected lifting columns with one central controller. As mentioned earlier the communication can be improved by optimal positioning the central controller, for example above the lifting columns.

Optionally, the system further comprises a signal distributor for receiving and forwarding signals between the central controller and one or more of the individual lifting columns. Such distributor may comprise a wireless signal transceiver. This provides further flexibility to the position op the central controller relative to the lifting columns. In addition, the distributor further increases the working area of the central controller.

To enable multiple group control with a central controller the central controller may comprise multiple computing means such as multiple processors, for example processor or group of processors for a group of selected lifting columns. Alternatively, the central controller comprises means to allocate processor time to a specific group of selected lifting columns. These allocation means may involve a optimizing control algorithm and/or a separate allocation processor and/or a dedicated allocation program.

In a further embodiment the central controller is moveable/portable. Such moveable central controller can effectively be used to control mobile lifting columns. To enable movement of the central controller a cart or wheels can be attached on or to the central controller.

In a further preferred embodiment according to the invention the central controller comprises communication means to enable communication with one or more external networks. Such external networks may include one or more of the following: workshop network for scheduling workshop jobs, financial network for billing purposes, service and maintenance network, for example. It will be understood that other external or internal company networks can also be coupled to the central controller. Examples of direct coupling of lifting columns with an external network is described in U.S. 61/844,616, which is included herein by reference.

Further features of a central controller are disclosed in WO 2015/163757 A1 which is included by reference herein.

In a further preferred embodiment the system comprises an external communicator configured for communicating between the lifting system and an external system. This communication may involve communication via the internet, providing wifi and/or intranet access on a mobile lifting column and/or central controller. This provides the user with additional sources of information. For example, manuals can be displayed easily on the column, including help functions over the internet, if required. Also, a clearance system can be provided that enables control of authorization and/or use of a pay-per-lift system. Such external communication can be embodied in a connectivity module that was described earlier.

The invention further also relates to a method for lifting a vehicle with a lifting system in an embodiment of the present invention, the method comprising the steps of:

- positioning a vehicle into a lifting position relative to the lifting system; and
- lifting the vehicle.

Such method provides the same effects and/or advantages as described for the lifting column and/or the lifting system.

In a preferred embodiment the method further comprises the step of measuring a change in the drive system.

In an embodiment of the invention the method comprises indirectly measuring the hydraulic liquid level, pressure, or volume and/or a change thereof. This provides an effective control of the lifting operation. In addition thereto or as an alternative thereto, the flow between the drive of the carrier and the hydraulic liquid reservoir can be measured.

In a further preferred embodiment of the invention the method further comprises the step of locking the carrier at a certain height relative to the frame by:

actuating the lock actuator;

moving the lock with the locking drive between a locked state and an unlocked state; and engaging or disengaging the lock from the locking rail in response to a movement of the lock actuator.

In one of the presently preferred embodiments of the invention the locking system of the lifting column moves to the locked state in case of a power failure, for example a hydraulic, pneumatic and/or electric power failure. This achieves a safety measure when working with the lifting column in one of the embodiments of the invention.

In a further preferred embodiment of the invention the method further comprises the step of positioning the lifting column with a displacement mechanism.

In a presently preferred embodiment the positioning the lifting column comprises the step of raising or lowering the handle for moving the lifting column between the displacement and stationary positions. This achieves an effective method to move the wheel between the different positions. As a further effect, this provides an effective visual indication for an operator to detect the position of the lifting column.

In a further preferred embodiment of the invention the method further comprises the steps of:

measuring the position of the locking element with the locking sensor:

determining the status of the locking mechanism and providing the status to a display; and displaying the status of the locking mechanism.

Preferably, the method further comprises the step of enabling and/or disabling operation of the lifting column and/or lifting system and after enabling of the lifting operation, the actual lifting of the vehicle. This improves the overall safety when lifting a vehicle.

In a further preferred embodiment of the invention the method further comprises the step of detecting an unsafe situation and providing a warning signal. Such warning signal can be visual and is optionally combined with an acoustic warning. The visual warning can be displayed on a touch screen of the lifting system and/or on a central controller and/or using another strategically located visualization element such as a light.

It is noted that features mentioned in relation to the system can be applied to the method according to the invention, and vice versa.

BRIEF DESCRIPTION OF THE DRAWINGS

Further advantages, features and details and of the embodiment will be elucidated on the basis of preferred embodiments therefor, wherein reference is made to the accompanying drawings, in which.

DESCRIPTION OF THE INVENTION

The following description is merely exemplary in nature and is in no way intended to limit the invention, its application, or uses. While the disclosure is described as having exemplary attributes and applications, the present disclosure can be further modified. This application is therefore intended to cover any variations, uses, or adaptations of the disclosure using its general principles. Further, this application is intended to cover such departures from the present disclosure as come within known or customary practice of those skilled in the art to which this disclosure pertains and which fall within the limits of the appended claims. Accordingly, the following description of certain embodiments and examples should be considered merely exemplary and not in any way limiting.

The mobile lifting column of the present invention is suitable for use with lift systems comprising any number of lifting columns, including systems having one, two, four or another number of columns. The columns may achieve lifting and lowering capability by any means known to those of skill in the art, including hydraulically, electrically, mechanically, and electromechanically. Lift systems compatible with the present mobile lifting column may be stationary and/or permanently affixed or attached to a certain location or may be mobile, capable of being transported via wheels or any other suitable means known to those in the art. With reference to the figures, like element numbers refer to the same element between drawings.

Figure 1A:
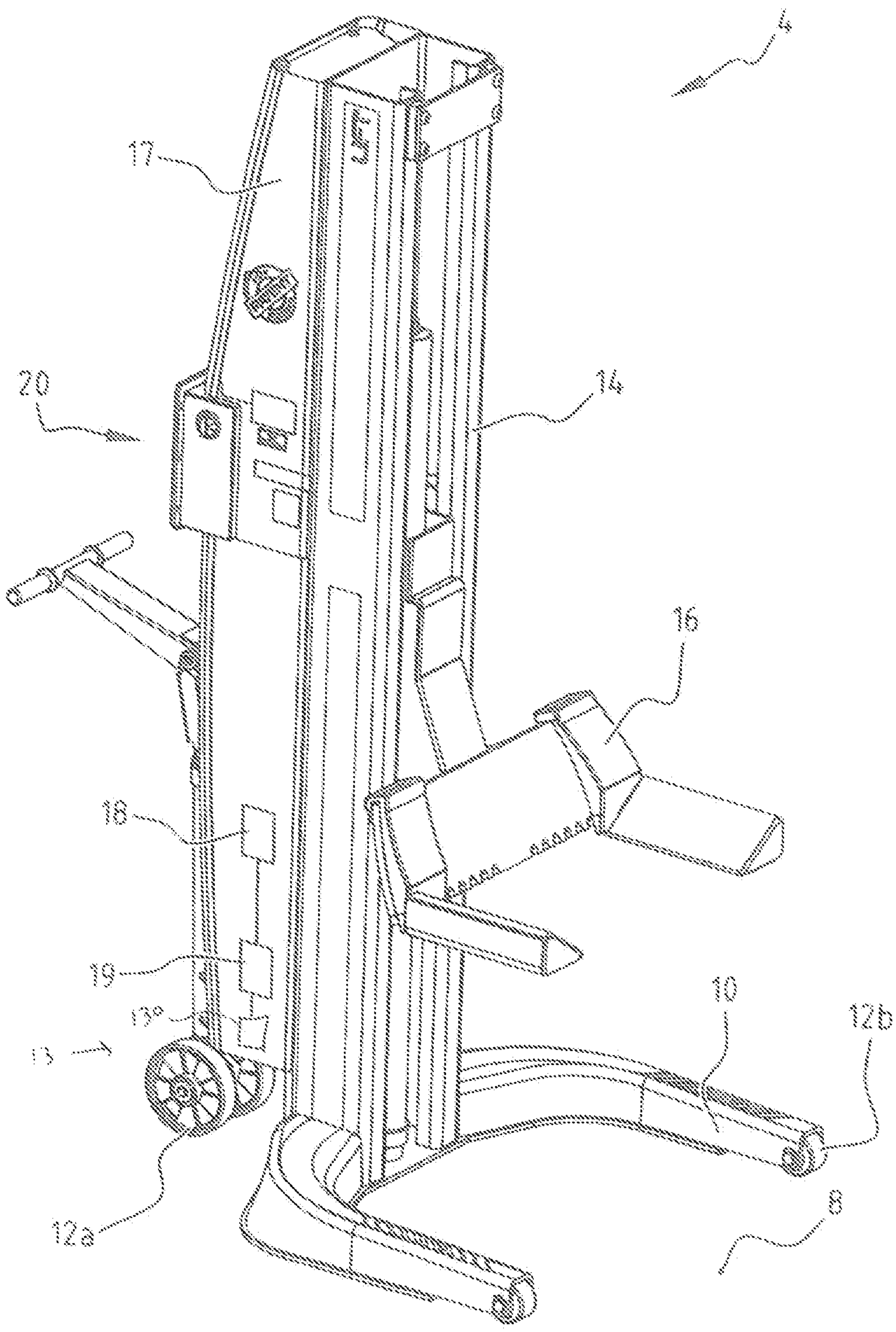
FIG. 1A shows a mobile lifting column according to a first embodiment of the invention.

Lifting column 4 (FIG. 1A) is positioned on ground surface 8 of for instance a floor of a garage or workshop, and comprises foot 10 which can travel on running wheels 12*a,b* over ground surface 8. Running wheel(s) 12 is/are part of a pallet truck mechanism enabling easy maneuvering of lifting column 4. Lifting column 4 furthermore comprises mast 14. A carrier 16 is moveable upward and downward along mast 14. Optionally, adapters can be used to adjust carrier 16 to specific wheel dimensions. Carrier 16 is driven by motor/drive system 18 that is provided in housing 17 of lifting column 4. In one embodiment, the motor of system drive 18 is a 3-phase low voltage motor controlled by a separate controller. In another embodiment, the motor of system 18 is a 3-phase low voltage motor with integrated controller. Such motor with integrated controller can also be used in combination with conventional lifting columns with conventional height measurement systems. Motor 18 is supplied with power from the electrical grid or by one or more batteries 19 that is provided on lifting column 4 in the same housing as motor 18, or alternatively on foot 10 (not shown). Display unit 20 may provide the user with information about the lifting system.

Figure 1B:
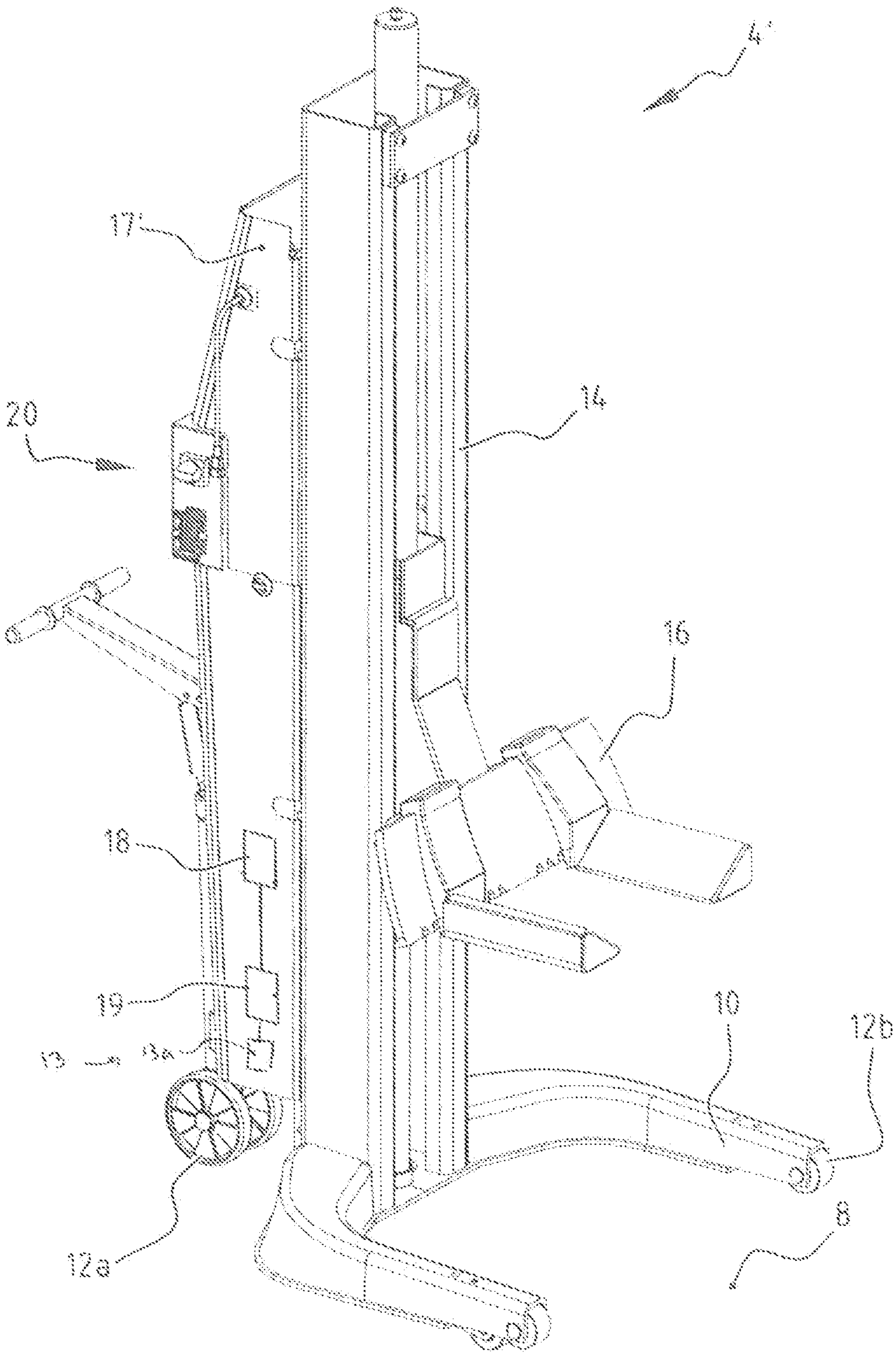
FIG. 1B shows a mobile lifting column according to a second embodiment of the invention.

In an alternative embodiment lifting column 4' (FIG. 1B) the same or similar components are applied as illustrated and/or described for lifting column 4. Same elements are indicated with same reference numbers.

Lifting column 4' comprises housing 17' with a different shape and size. In particular housing 17' is provided with a smaller height as compared to housing 17. This affects the required amount of material, the inner space for receiving and holding further components, and the esthetical appearance of lifting column 4, 4'.

Optionally, column 4, 4' is provided with moving system 13 (configured for moving or displacing column 4, 4' using wheels 12*a,b* with drive 13*a*. In the illustrated embodiment drive 13*a* is powered by batteries 19 acting as power system for moving system 13. It will be understood that other embodiments of moving system 13 can also be envisaged, for example comprising a separate power system.

Further embodiments will be illustrated with the use of lifting column 4 and/or lifting column 4'. It will be understood that most features and effects can be exchanged between the different embodiments of lifting columns 4, 4'.

Lifting system 2 (FIG. 2A), 2' (FIG. 2B) comprises four mobile lifting columns 4 in the illustrated embodiment. Lifting columns 4 lift passenger car 6 from ground 8. In the illustrated embodiment car 6 is lifted over distance D. It will be understood that other heights can also be envisaged in accordance with the present invention.

Lifting columns 4 are connected to central controller 22 by wireless communication means 24 on individual lifting column 4 and wireless communication means 26 on central controller 22. Optionally, controller 22 is provided with display 23. In the illustrated embodiment communication means 24 are provided in (local) mobile lifting column controller 28 in control box 30. Central controller 22 can be provided as a separate unit at a desired location in the workshop and/or can be provided in or at one or all of mobile lifting columns 4. Wireless communication means 24, 26 involve one ore more transmitters and/or receivers.

The illustrated lifting system 2 includes at least two lifting columns 4. Each of the lifting columns has at least one ascent mode and one descent mode, and is under the influence of central controller 22. In the illustrated embodiment controller 22 is positioned centrally above lifting columns 4 assuring a good communication path between the individual lifting columns 4 and the central controller 22.

Central controller 22 determines the desired control actions. In one of the embodiments of the invention this may involve receiving a measurement signal measuring the actual height of carrier 16 of individual lifting column 4 that is measured with height or movement sensor 32 attached to an individual lifting column 4. Sensor 32 is capable of measuring position and/or speed of carrier 16. In the illustrated embodiment sensor 32 is a potentiometer and/or an inclinometer. Optionally, pressure or load sensor 33 may be used for monitoring, control and indication of the correct positioning of the load that is lifted with lifting system 2. Optionally, vehicle detector 31 is provided to detect the presence of vehicle 6. It will be understood that alternative sensors can be used in combination or as an alternative.

In presently preferred embodiments of the invention central controller 22 determines the desired control actions using measurement signals representing the status and/or actions of drive 16. In an embodiment of the invention controller 22 involves directly and/or indirectly measuring the hydraulic liquid level, pressure, or volume and/or a change thereof. This provides an effective control of the lifting operation. In addition, or as an alternative thereto, the flow between drive 18 of carrier 16 and the hydraulic liquid reservoir can be measured. Several embodiments of such measurement signal will be described in this description in relation to further figures (for example in relation to FIG. 8).

In the illustrated embodiment, central controller 22 may communicate with external system 34. Several embodiments of such measurement signal will be described in this description in relation to further figures (for example in relation to FIG. 2C).

Figure 2A:
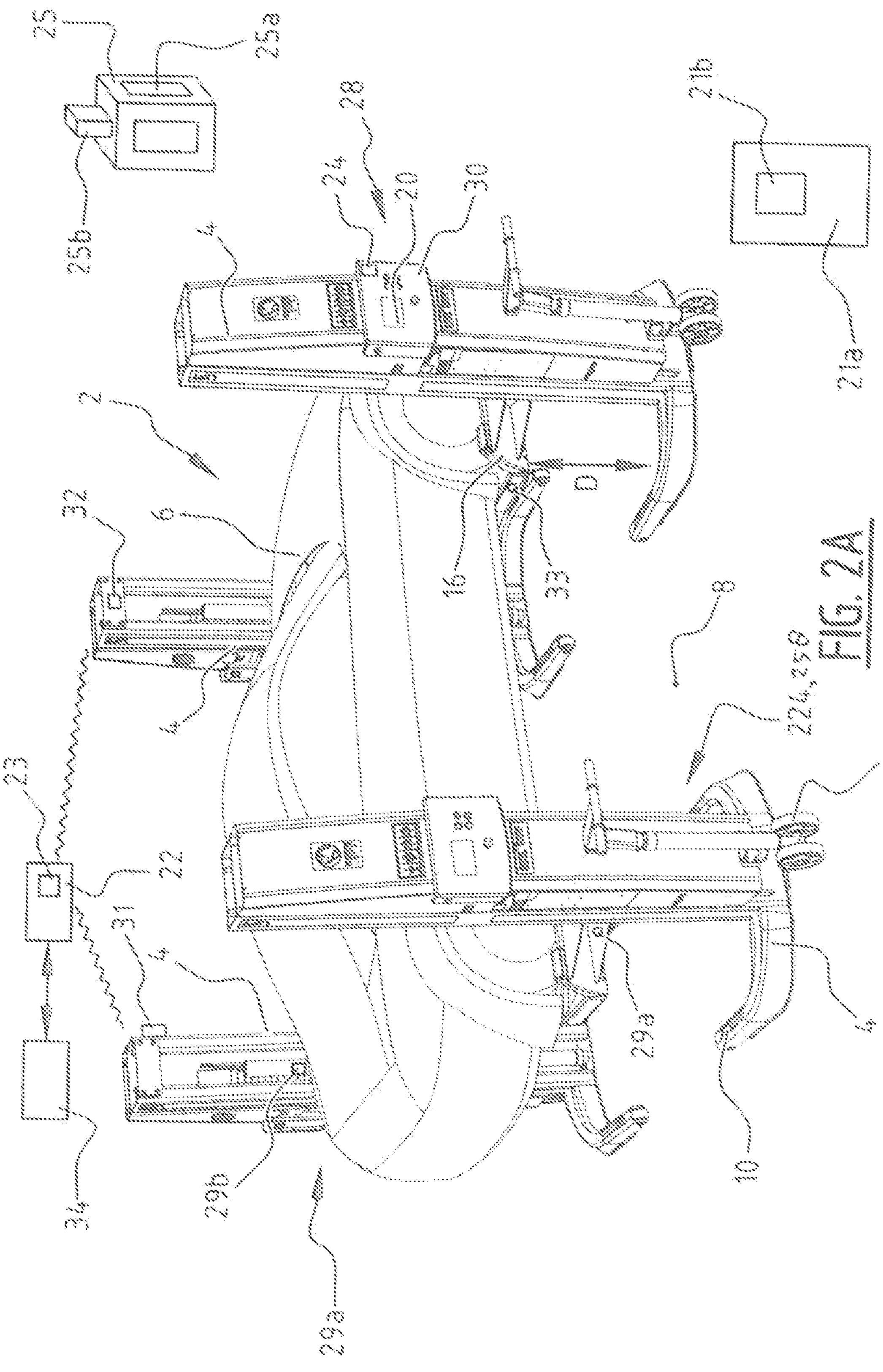
FIG. 2A shows a lifting system with a group of lifting columns according to the first embodiment of FIG. 1A.
Figure 2B:
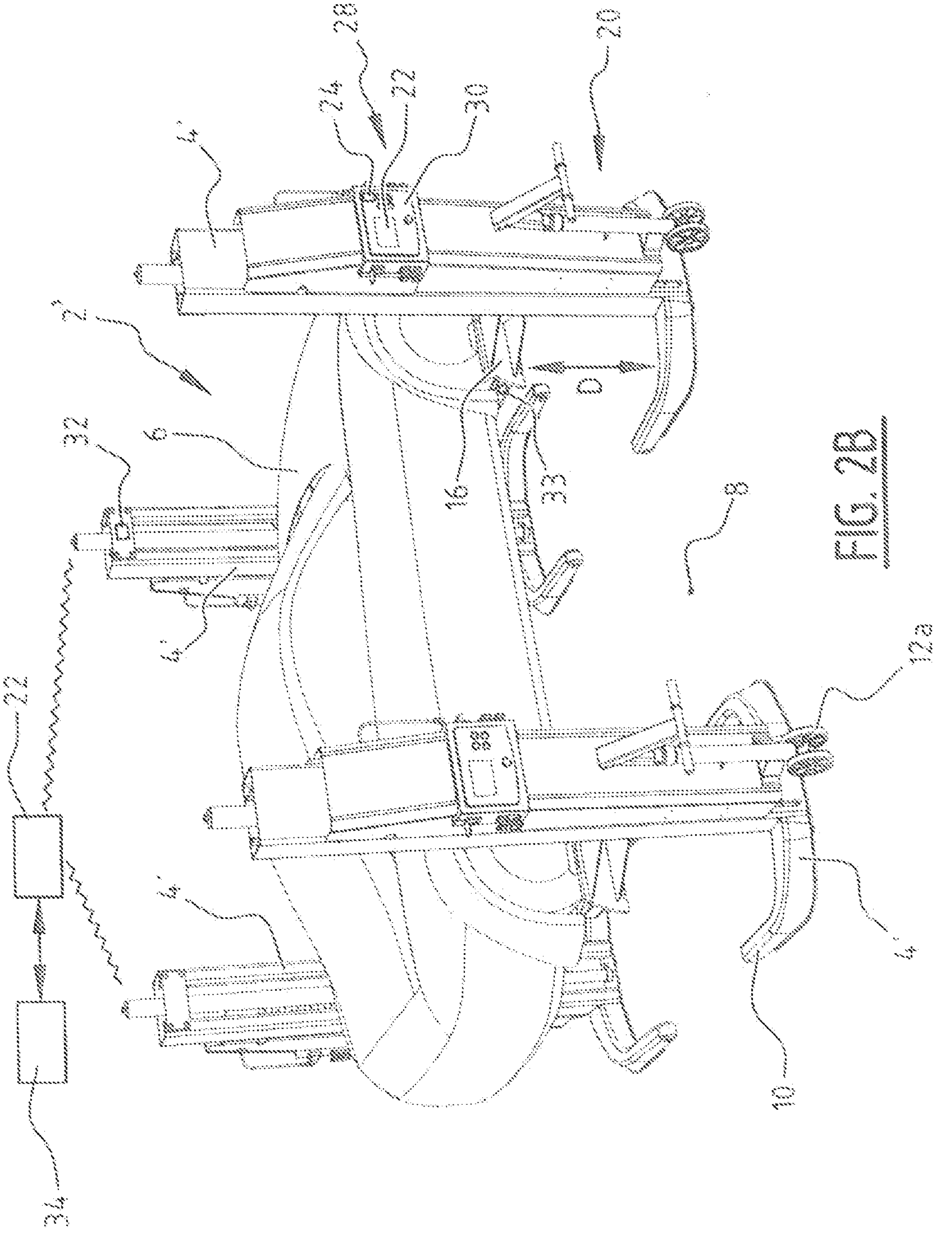
FIG. 2B shows a lifting system with a group of lifting columns according to the second embodiment of FIG. 1B.
Figure 11A:
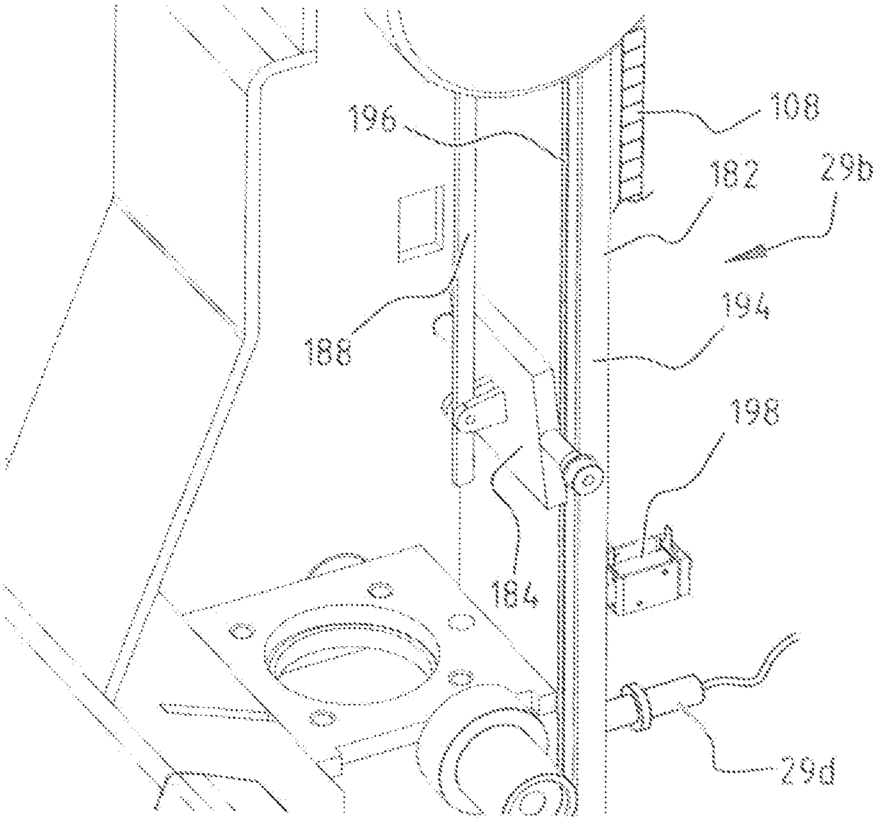
FIGS. 11A-B, 12 show details of embodiments of the lock actuator and locking drive for a locking system of FIG. 10.
Figure 11B:
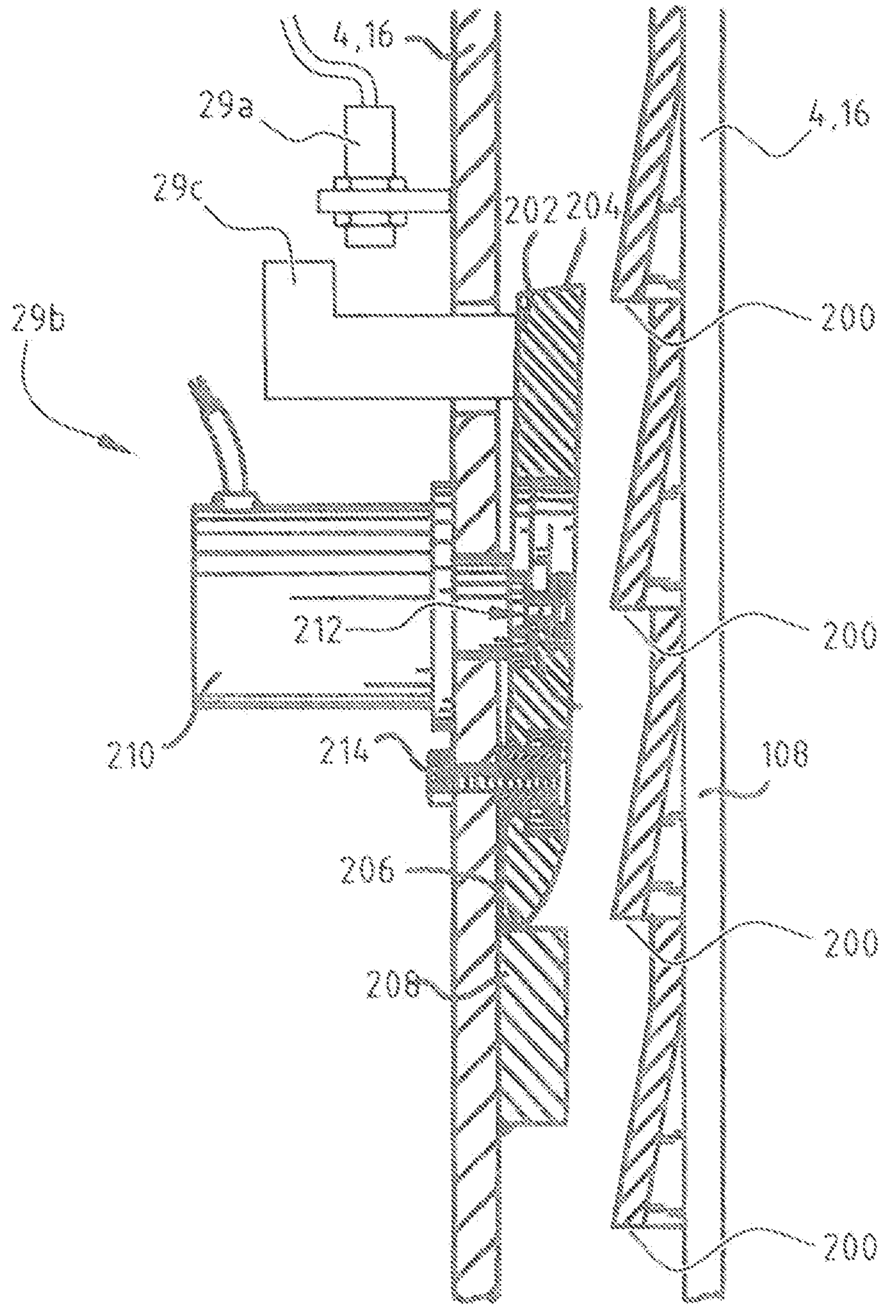

Furthermore, the illustrated embodiment shows lock sensor 29*a* (FIG. 2A, 11B). Lock sensor 29*a* detects/measures the status of locking mechanism 29*b*. Optional load sensor 33 detects the presence of a load and/or the actual load that is supported by carrier 16. In this embodiment, sensor signals are provided to controller 22.

In the illustrated embodiment, in addition, or as an alternative, remote control 21*a* (FIG. 2A) is provided with display 21*b*. Preferably, displays 20, 21*b*, 23 are touchscreens. Light 25 is schematically illustrated and is provided with one or more signaling lights 25*a*, preferably LED lights. Optionally, acoustic signal generator 25*b* is provided to assist the signaling function of light 25. It will be understood that light 25*a* and generator 25*b* can be positioned at or adjacent system 2 and/or at a central location in a workshop, for example.

Lifting system 2' with lifting columns 4' (FIG. 2B) comprises the same or similar components as illustrated and/or described for lifting system 2 with lifting columns 4. Same elements are indicated with same reference numbers.

In a further embodiment of the invention, central controller 22 (FIG. 2C) is configured to control multiple groups of lifting systems 2*a*, 2*b*. Such multi-group controller is described in US 2017/0174484 A1 which is incorporated herein by reference. It will be understood that features of the different embodiments of lifting systems 2, 2' can be exchanged and applied in different combinations and configurations. Central controller 22 detects height differences between lifting columns and/or differences between the status and/or actions of drive 16, calculates the required control actions with computing means 36, such as a processor, for individual lifting columns, and communicates the control actions to the relevant individual lifting columns 4, 4'. In the illustrated embodiment battery 38 provides power to central controller 22. Alternatively, or in addition, power is provided through connection 40 to the electrical grid. Data can be stored in memory/storage 42. Optionally, indoor positioning system 43 is provided to determine position and/or height of carrier 15 with transmitters/sensors 43*a* and optionally making use of further sensors 62 attached to or or provided in control box 30 and/or sensor 33 attached to carrier 16 that optionally provides a dual function as load sensor and position sensor. Central controller 22 is optionally provided with a wired and/or wireless connection 44 to enable connection between communication module 46 of central controller 22 to internal and/or external networks, involving internal company networks for workshop control 48, financial control 50 and maintenance 52, for example, and external networks 54 of suppliers and/or customers, for example. Optionally, central controller 22 is provided with displacement means 22*a*, such as wheels and/or guides to enable displacement of central controller 22 in a room. Optionally, in an alternative embodiment central controller 22 comprises a portable housing. In a displaceable and/or portable embodiment central controller 22 can be positioned efficiently and effectively in relation to the relevant mobile lifting columns 4, 4'. Central controller 22 can be positioned and moved along a ceiling, wall and/or workshop floor depending on the specific circumstances and embodiment of controller 22.

Individual lifting columns 4 are provided with display 20 that is provided in or at control box 30. Display 20 preferably relates to a touch screen. Control box 30 optionally comprises a number of buttons 56 to provide additional input means for a user, an RFID antenna 58 enabling a user to identify himself with an ID-key 60 and/or pay for a number of lifts with a pre-paid card. In the illustrated embodiment control box 30 further comprises position determining means 62 and communication means 24, preferably providing wireless functionality to communicate in one or more environments such as LAN, WAN, VPN intranet, internet etc. that are schematically shown in the illustrated embodiments. Control box 30 is further provided with input/output ports, such as USB. SD card reader, smart phone communication possibilities etc. to improve the functionality. Display 20 may provide warning signals to the user. Display 20, preferably a TFT-LCD, is protected by a display lens cover of a resilient material, preferably scratch-resistant.

Figure 2C:
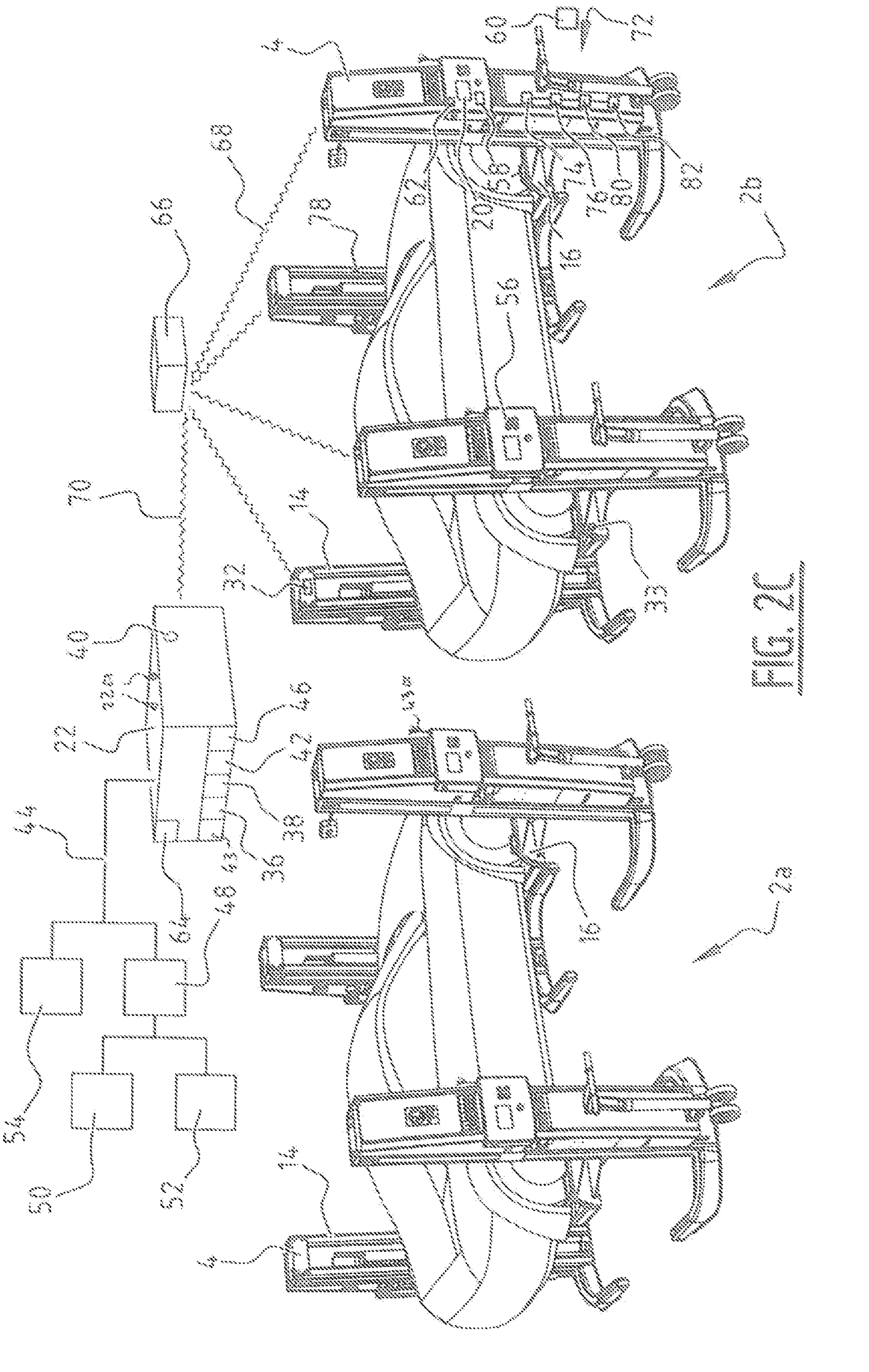
FIG. 2C shows an alternative lifting system comprising a central group controller controlling multiple groups of lifting columns.

Transmitter/receivers 24, 26 provide user instructions to central system controller 22. On a central level controller 22 determines the individual control actions to be taken for all lifting columns 4 in system 2*a,b* (FIG. 2C). Transmitter/receivers 24, 26 provide the control actions from central controller 22 to the individual lifting column 4. Information about the actual position of carrier 16 and/or drive (system) 18 and/or other relevant data is measured. The measurement data is provided to central controller 22 that determines if and what control actions are required. In this illustrated embodiment no direct communication between individual lifting columns 4 is required. This significantly contributes to the robustness of lifting system 2.

In an advantageous embodiment according to the invention, central controller 22 (FIG. 2C) can be used to control a first group 2*a* of lifting columns 4 and a second group 2*b* of lifting columns 4. Operation and control of a single group 2*a*, 2*b* is substantially similar to the operation and control of a single system 2 with lifting columns 2. Optionally, first computing means 36 involving a first processor is provided with second or further computing means 64 involving second processor. Furthermore, central controller 22 can be provided with additional multiple components to improve overall control operation and robustness.

Optionally, central controller 22 is provided with a number of communicators/distributors 66, such as an RF-host, that send and/or receive signals 68 between lifting columns 4 and communicator 66, and signals 70 between communicator/distributor 66 and central controller 22. Communicators/distributors 66 provide additional robustness to the overall operation of the groups 2*a*, 2*b* of lifting columns 4.

In a presently preferred embodiment lifting column 4 is provided with release system 72 (schematically illustrated in FIG. 2C, most right lifting column). In the illustrated embodiment central controller 22 provides a clearance signal to an individual lifting column 4 involving a release signal enabling the effective use of carrier 16. The release signal may release a software lock preventing motor 74 and/or pump 76 of lifting column 4 to operate. Alternatively, or in addition thereto, release signal may release a hardware lock, for example a clamp locking carrier 16. Payments can be received via card 60, for example, generating payment instructions and sending the instructions to the accounting department of the user and/or receiving an authorization signal authorizing the system and user to perform a number of lifts and/or use lifting system 2 for a specific period of time. Sensor 78 can be used to inform controller 22 of lifting activities of carrier 16. Alternatively, or in addition thereto, motor run time sensor 80 may provide controller 22 with motor run time information of motor 74 and/or pump activity sensor 82 may provide controller 22 with pump activity information of pump 76 and/or load sensor 33 (for monitoring, control and indication of the correct positioning of the load that is lifted with lifting system 2) may provide central controller 22 with information on the actual loads carried by carrier 16, preferably in combination with the time period the carrier 16 is exposed to the load.

Figure 2D:
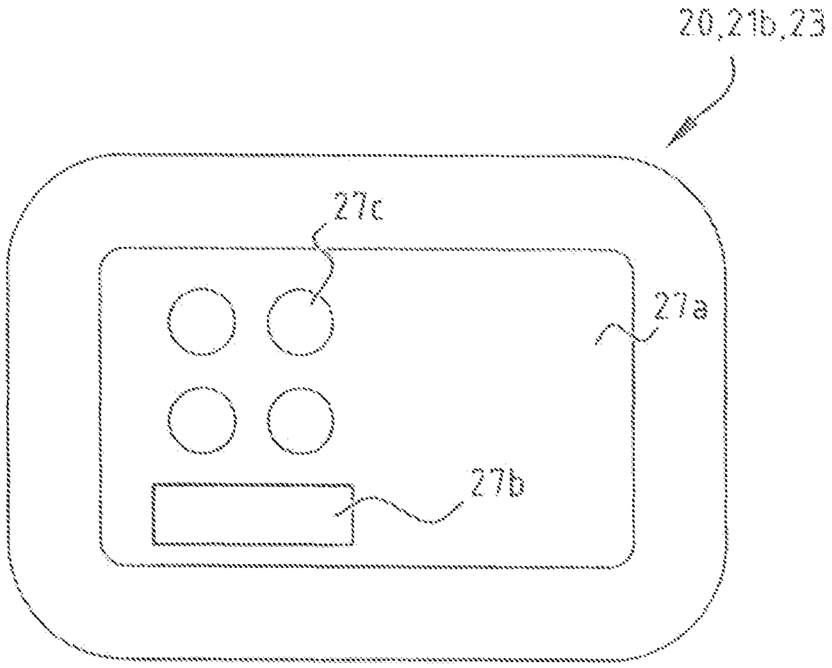
FIG. 2D shows a display that can be used for a lifting column according to the present invention.

Display 20, 21*b*, 23 (FIG. 2D) schematically shows screen background 27*a*, text box 27*b* and visual elements 27*c* that represent lifting columns 2. With changing colours and/or text, elements 27*a-c* indicate a safe or unsafe situation, optionally assisted by light 25*a* and/or generator 25*b* (FIG. 2A).

Figure 12:
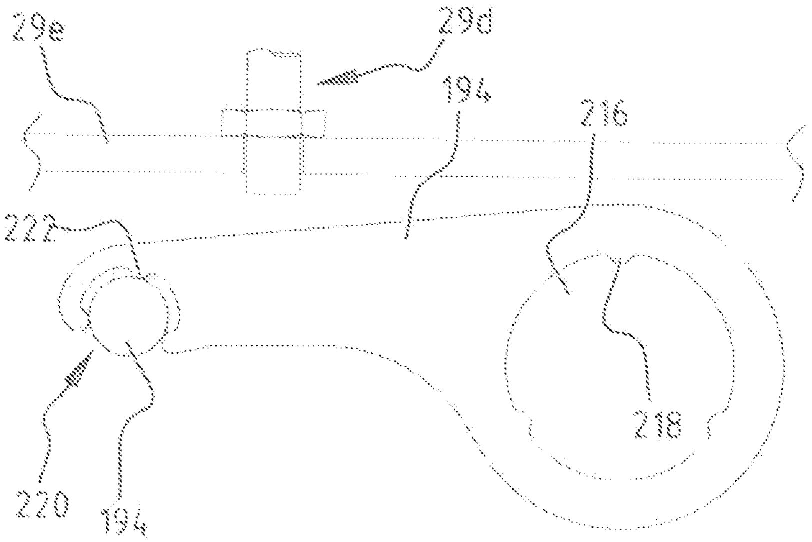

When lifting vehicle 6 the vehicle is positioned relative to carriers 16. When raising carriers 16 relative to frame 4 of mobile lifting columns the actual height is preferably measured with a type of height or movement sensor 32 and/or status of drive system 18. When the desired height and/or status is reached and all carriers 16 are equally positioned, in the illustrated embodiment the carriers 16 are lowered into their lock with locking mechanism 29*b*. For example, this requires changing of the actual position of locking element 202 (FIG. 12) that can be detected by sensor 29*d* and/or cam 29*c* (FIG. 11B) that can be detected by sensor 29*a*. The signal of sensor(s) 29*a,c* is/are preferably provided to controller 22 that enables a visual indication on display 20, 21*b*, 23, optionally assisted by further assisting signals with light 25*a* and acoustic generator 25*b*. Optionally, a central controller 22, remote control 21*a*, chief operator etc. is provided with the measurement signal. Visualization of a safe or unsafe working situation can be performed by changing the color of the screen background 27*a* (FIG. 2D) and/or indicating in text box 27*b* that all columns are safe to use. Screen background 27*a* helps a user to be informed of a safe or unsafe situation even from a distance. The condition of individual columns can be provided with visual elements 27*c*. For example, green background color indicates a locking situation wherein a user can perform operations on vehicle 6, while a red background indicates an unsafe situation and an orange background indicates that some but not all lifting columns are locked. It will be understood that other configurations can also be envisage in accordance with the invention.

Figure 3:
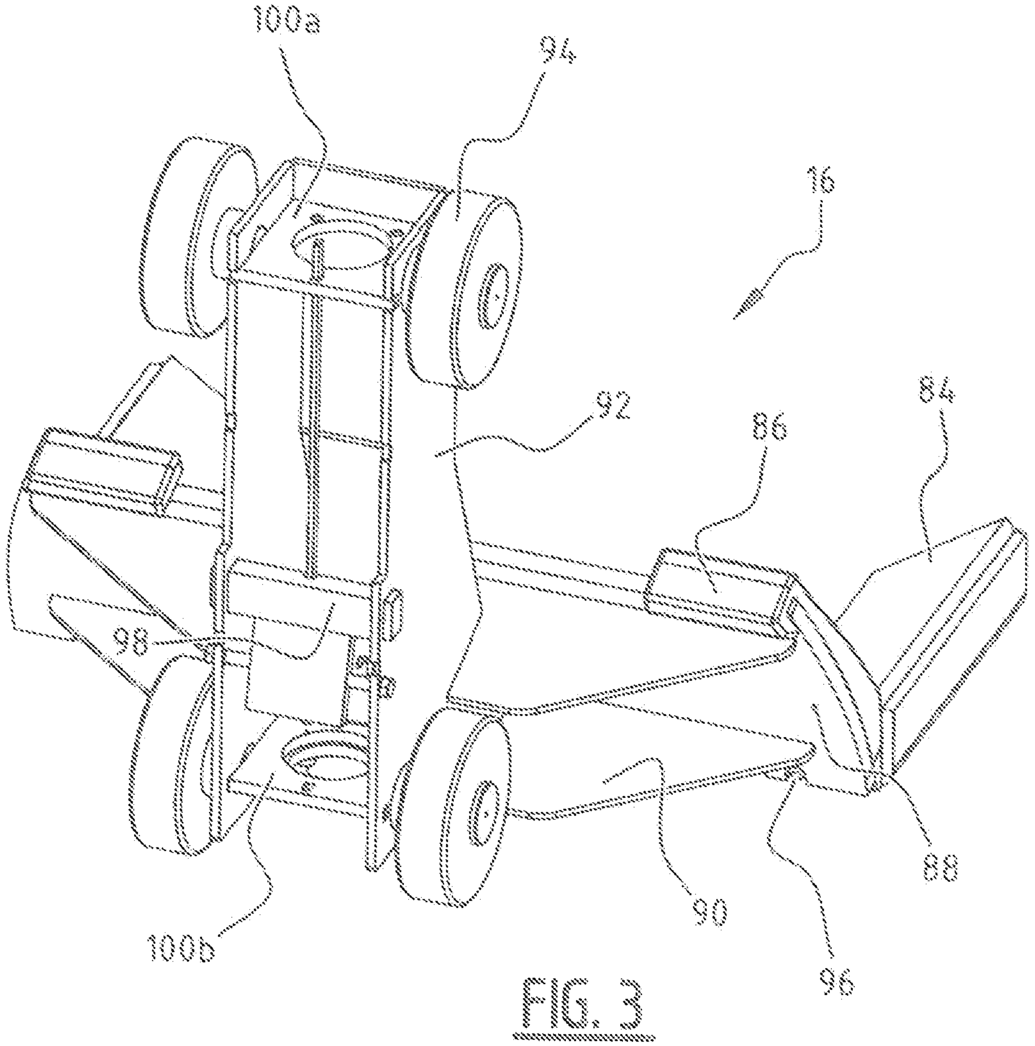
FIG. 3 shows an embodiment of a carrier for a lifting column according to the present invention.

Carrier 16 (FIG. 3) comprises two forks 84. In the illustrated embodiment forks 84 have claws 86 that engage front part 88 of carrier 16. Plates 90 connect front part 88 with carrier frame 92. Frame 92 has four guiding wheels 94. In the illustrated embodiment claws 86 are fixated relative to front part 94 with fixation element 96, for example a pen or other suitable element. Frame 94 has a U-shape profile with connecting rod 98 and connecting plates 100*a,b*. The U-shaped profile allows for a controllable (reduction of) torsional stiffness to enhance the contact between wheels 94 and mast 14. This prevents an overload on wheels 94 due to (small) misalignments between wheels 94, carrier 16 and mast 14. It will be understood that alternatively forks 84 can also be provided in an integrated manner with carrier 16.

Figure 4:
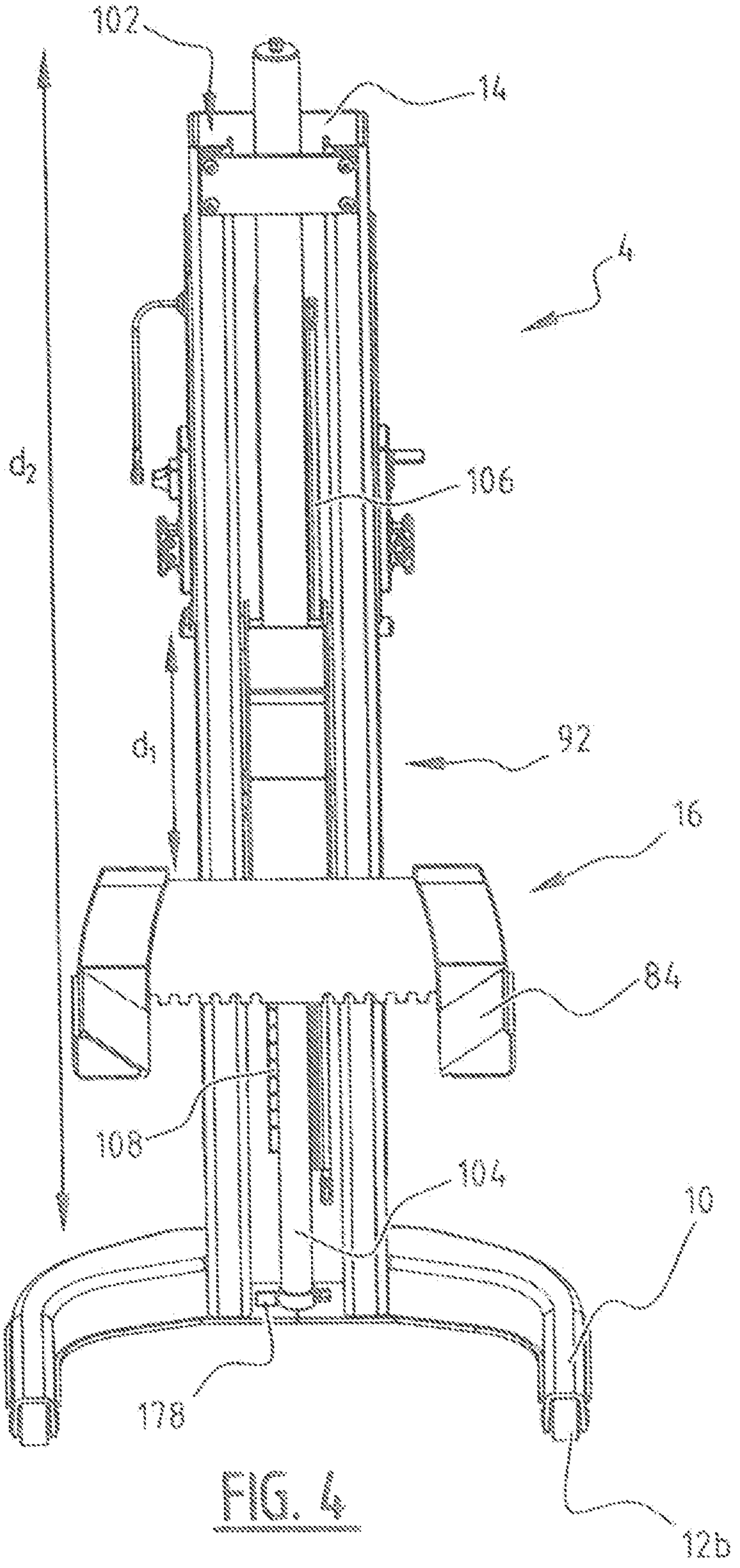
FIG. 4 shows a view of an embodiment of a lifting column according to the present invention.

Carrier 18 (FIG. 4) comprises forks 84 and guiding frame 94. Frame 94 extends over length $d_1$ along guide rail 102 of mast 14 in a substantial vertical direction. Guide rail 102 is provided with cylinder 104. Guide rail 102 extends over length $d_2$ along mast 14. It is noted that this length $d_2$ is mostly related to the length or height of cylinder 104. Mast 14 also houses locking system 106 and locking rail 108. In the illustrated embodiment locking rail 108 extends over a substantial part of the length or height of mast 14.

Lifting column 4 comprises pallet truck mechanism 110 (FIG. 5) for displacing/positioning lifting column 4. An operator is provided with information and/or provides input to lifting column 4 with control box 30 that comprises display 20. Lifting column 4 further comprises cover 17, 17'. Cover 17, 17' protects a number of components against fouling and damage. For example, charger 112 and connector 114 are provided behind cover 17, 17'. This provides an integrated design.

Figure 6:
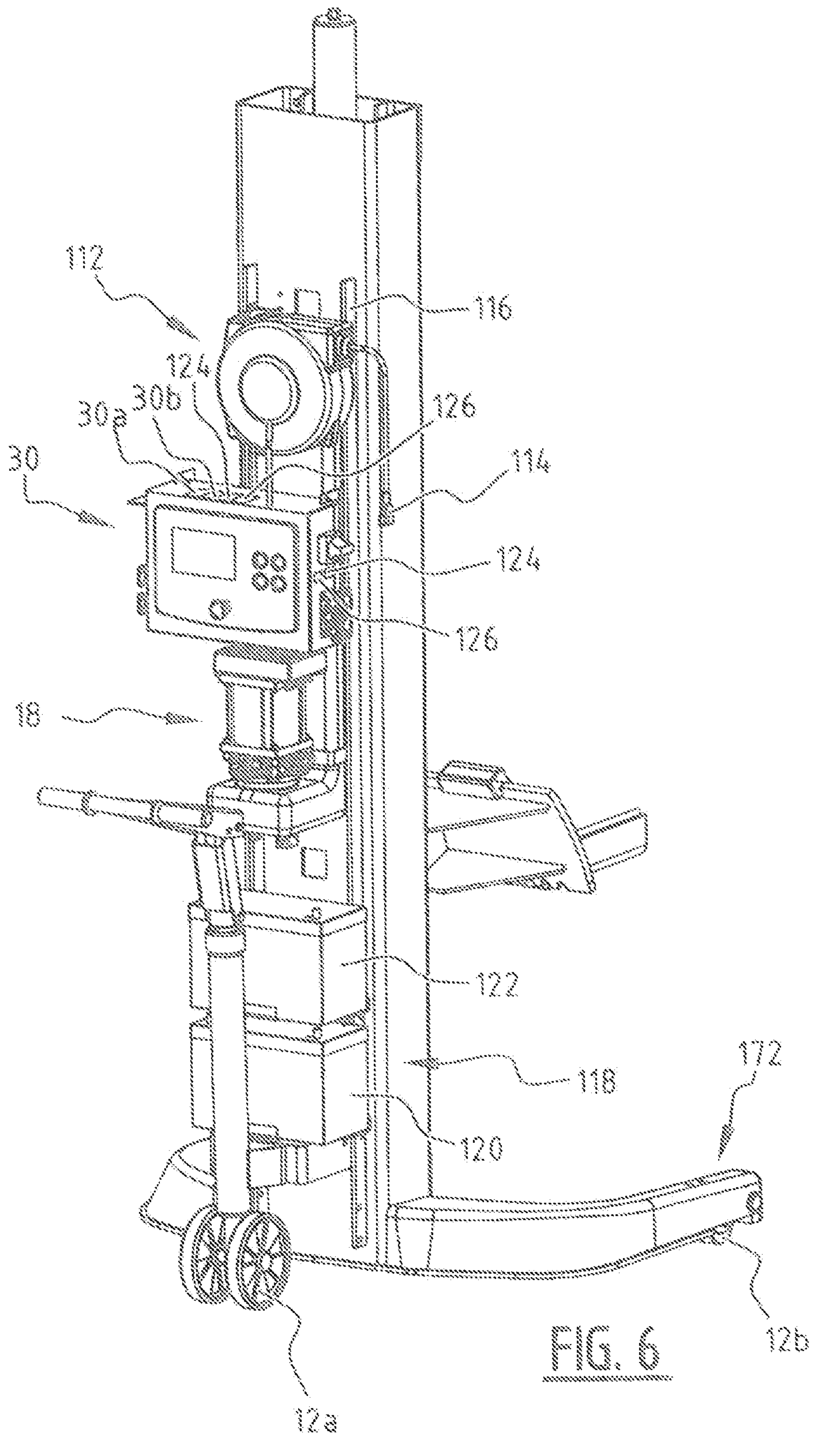
FIG. 6 shows one of the preferred configurations of the drive system for a lifting column according to the present invention.

Mounting rail 116 (FIG. 6) enables a robust connection of cover 17, 17' to mast 14 of lifting column 4, 4'. In the illustrated embodiment energy system 118 comprises first battery 120 and second battery 122. Drive system 18 is in the illustrated embodiment provided above energy system 118. An overcharge monitor 124 is provided in control box 30 that also comprises an integrated switch circuit 30*a* and resistance 30*b* for a safety measure to prevent overcharging of batteries 120, 122. Connectivity module 126 is also provided in control box 30 to connect lifting column 4 with other (external) systems. Optionally, sensor 32 is provided at mast 14 of lifting column 4 to detect the velocity of a moving carrier 16.

Figure 7:
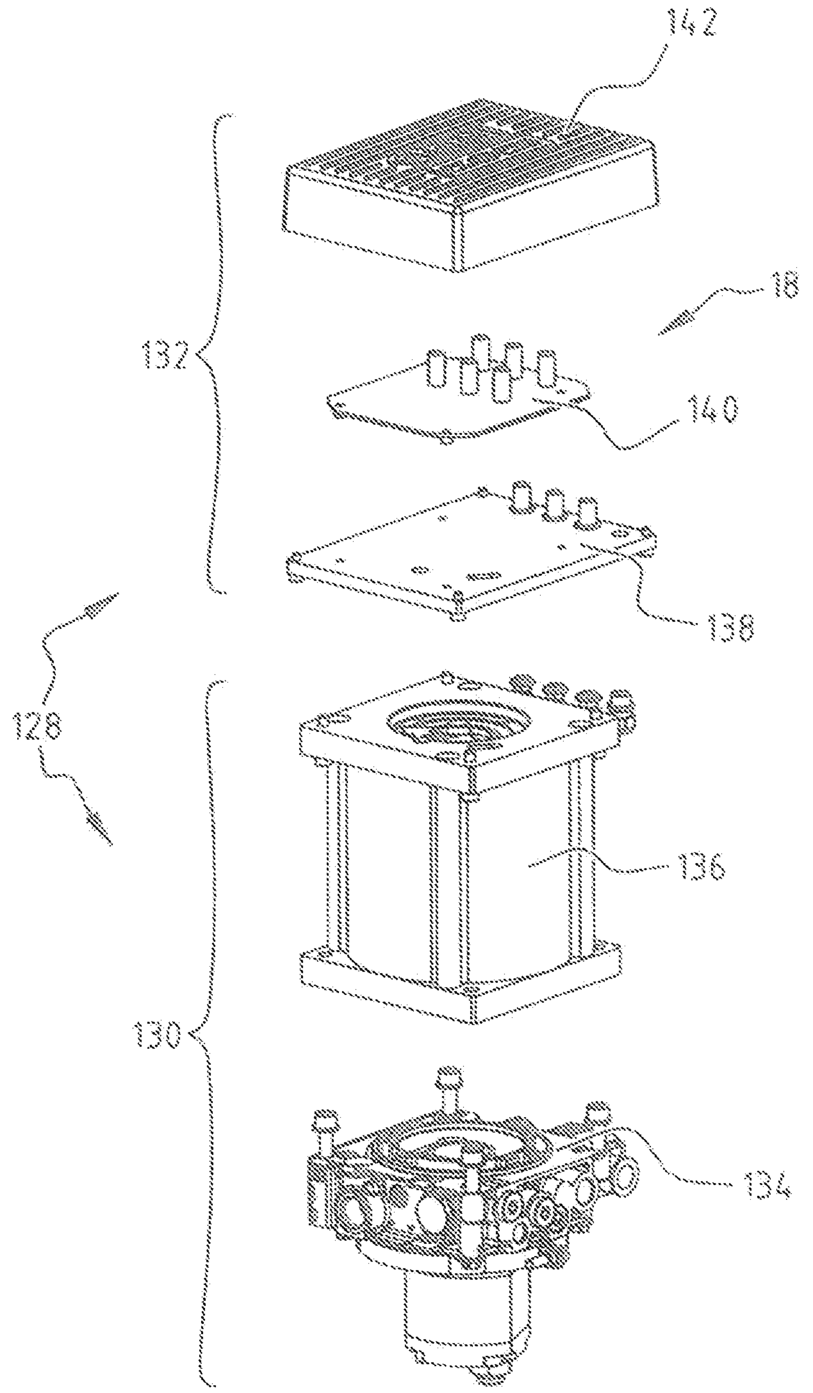
FIG. 7 shows details of the drive system of FIG. 6 with motor and integrated motor controller.

Drive system 18 comprises integrated system 128 (FIG. 7) comprising motor and pump assembly 130 and motor controller 132. Assembly 130 comprises pump and valve 134 and PM motor 136. Motor controller 132 comprises plate 138, print 140 and cover 142.

Figure 8:
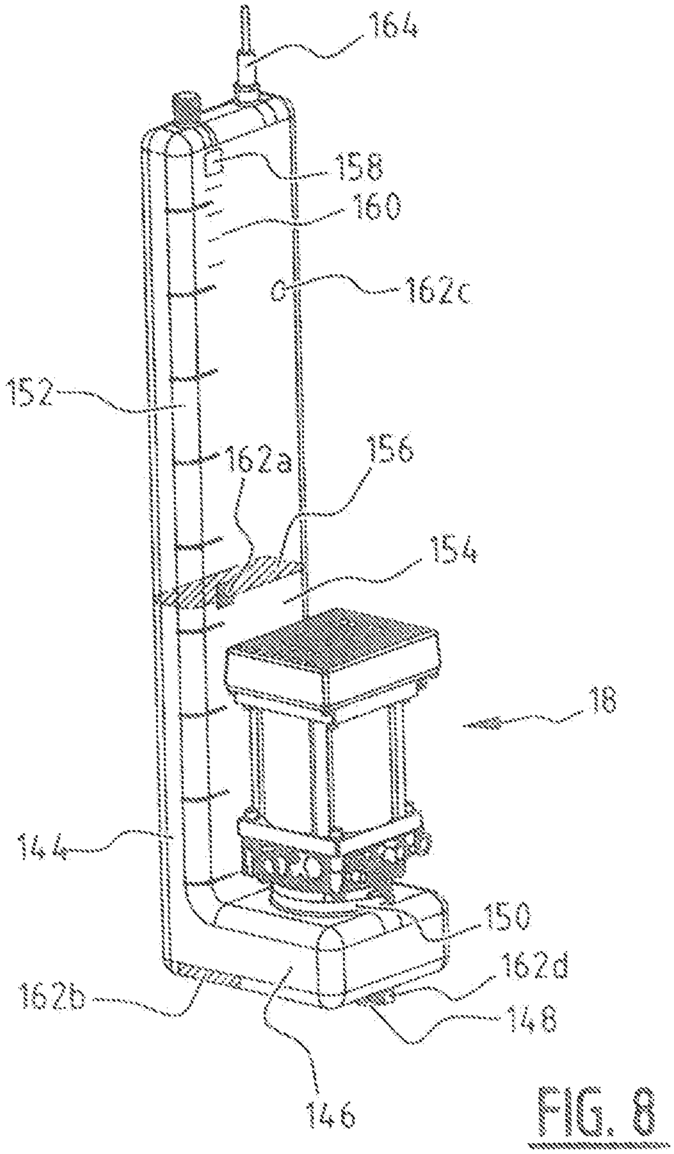
FIG. 8 shows details of the hydraulic reservoir of the drive system of FIGS. 6 and 7.

Drive system 18 further involves reservoir 144 (FIG. 8). In the illustrated embodiment reservoir 144 has bottom part 146 with opening 148 and pump connection 150. Reservoir 144 is further provided with vertical extending part 152. In use, reservoir 144 is filled with hydraulic oil 154 defining oil level 156. In the illustrated embodiment several sensors have been illustrated. It will be understood that these relate to exemplary embodiments of the invention and other configurations of one or more of these sensors or further alternative sensors can also be envisaged in accordance with the invention. In the illustrated embodiment ultrasonic sensor 158 is mounted at the top of the vertical part 152 of reservoir 144. Sensor 158 provides signal 160 that is reflected by oil level 156. This indicates the position of oil level 156. Float 162*a* also measures oil level 156. Load cell 162*b* measures the amount of oil in reservoir 144. Pressure sensor 162*c* measures pressure differences indicating the position of oil level 154. Flow sensor 162*d* measures the amount of flow from and/or to reservoir 144. Furthermore, in addition or as an alternative to the aforementioned sensor(s), a flow sensor can be provided in hydraulic circuit, for example in suction pipe. It will be understood that other locations for flow sensor can also be envisaged in accordance with the present invention. Reservoir 144 is provided with connection 164 to connect sensors 158, 160, 162*a-d* to control box 30.

In an alternative embodiment lifting column 4 is provided with a further measurement system 178 (schematically illustrated in FIG. 4) that measures displacement of a piston that drives carrier 18. Such measurement system is disclosed in U.S. Patent Application Publication No. 2016/0052757 and incorporated herein by reference. In this illustrated measurement system a hydraulic circuit is operatively connected to hydraulic cylinder with the piston.

Figure 9:
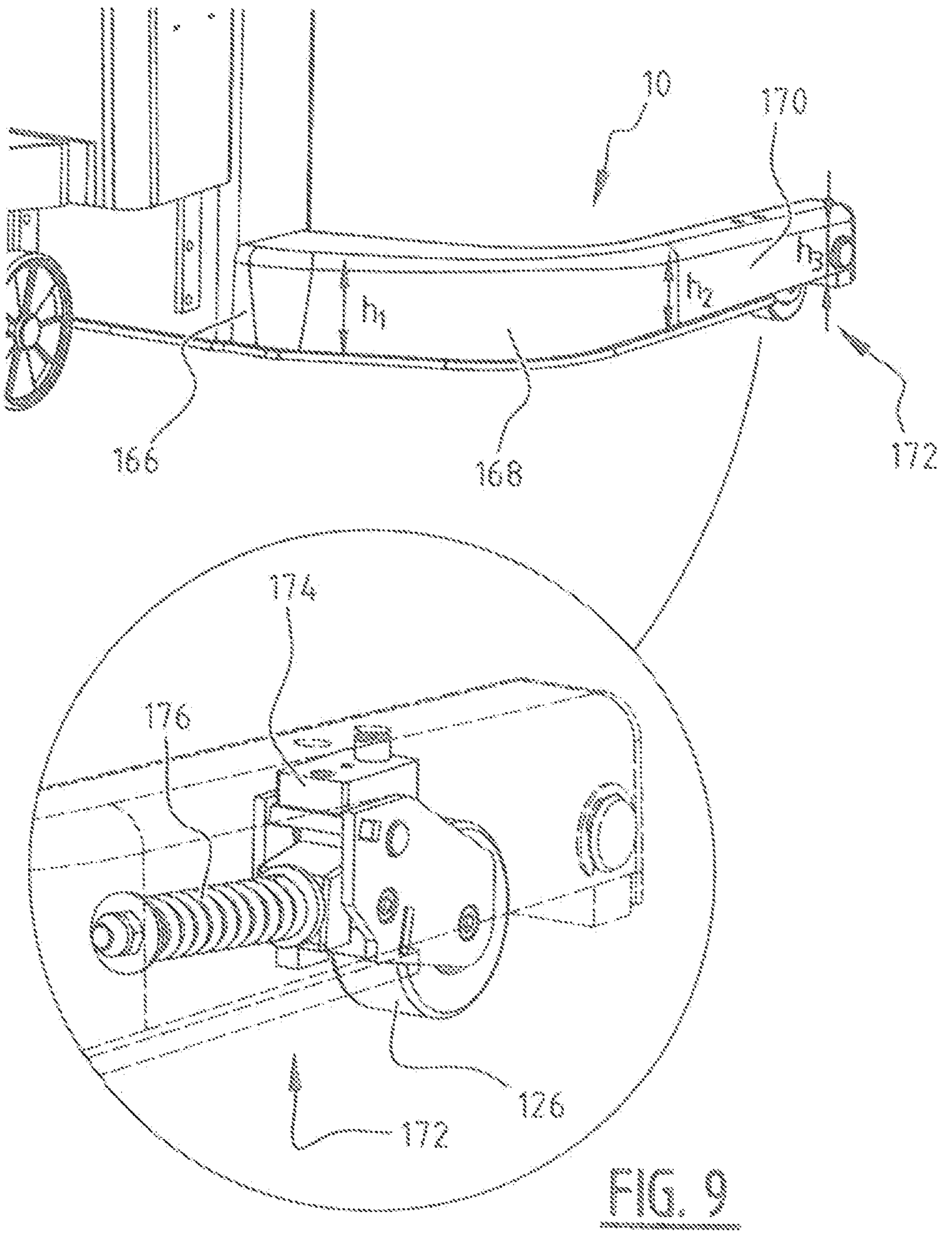
FIG. 9 shows a foot of a column according to the present invention with modular cartridge.

Foot 10 of lifting column 4 (FIG. 9) comprises connecting part 166 having height $h_1$, curve part 168 with height $h_2$ and front part 170 having height $h_3$, with decreasing height from $h_1$ to $h_3$. This provides maximum strength at connecting part 166 and maximum space for manoeuvring front part 170. Front running wheel or additional wheel 12*b* is provided in cartridge 172 that is located in front part 170 of foot 10. Cartridge 172 (detail of FIG. 9) comprises frame 174 and spring element 176. Cartridge 172 is designed that it may be replaced as a whole, including additional wheel 12*b*.

One or more of controllers 22, 28 receive measurement signals from sensors 158, 160, 162*a-d* and/or other sensors. Controller(s) 22, 28 determine(s) movement and/or height of carrier 16 and/or actions/status of drive system 18, for example. Preferably, local controller 28 is connected to central controller 22 configured for controlling the lifting columns, optionally communicating with (local) controllers of lifting columns. Central controller 22 and/or local controller 28 determine movement, height and/or speed differences between individual carriers 16 of a lifting system 4, 4' (FIG. 1) and determine required control actions. These control actions may result in sending control signals/actions to motor/pump assembly 128 of drive system 18.

When lifting car 6 a number of mobile lifting columns 4,4' are positioned around vehicle 6. When the lifting operation is approved carriers 16 start moving along masts 14. As soon as the desired height D above ground surface 8 of carriers 16 is reached carriers 16 are stopped. Preferably, carriers 16 are locked when working on the (lifted) vehicle.

Figure 10:
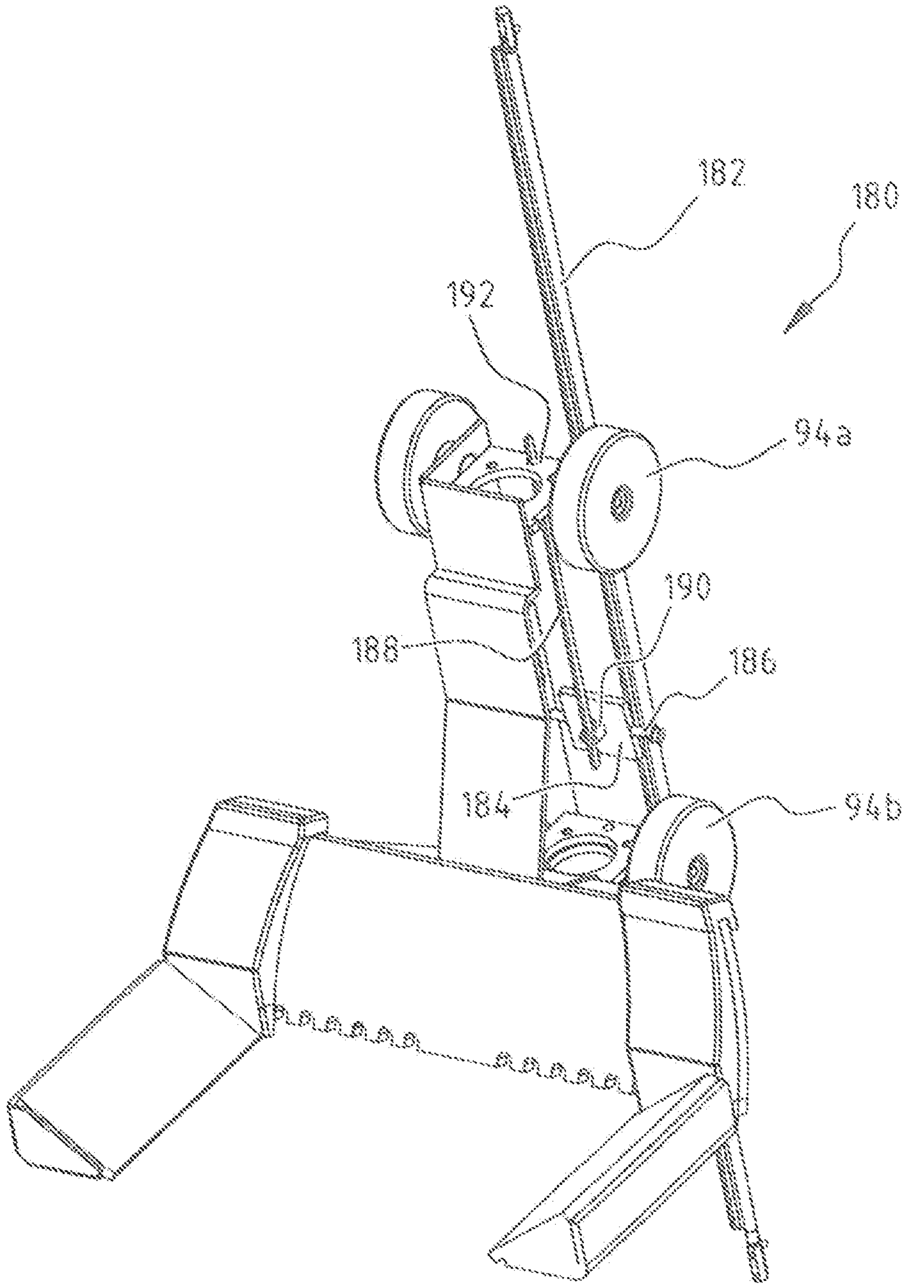
FIG. 10 shows a carrier and locking system for a lifting column according to the present invention.

Locking system 180 (FIG. 10) comprises lock actuator 182 that extends over a substantial part of the length or height of mast 14. Lock 184 comprises a block/blocking element capable of engaging with locking rail 108 (FIG. 4), and optionally a pawl with pen 186. Lock 184 is provided at one end of rod 188. Rod 188 is connected to lock or block 184 with connection 190. Furthermore, rod 188 is connected to guiding/frame part 92 of carrier 16 at upper connection 192. Carrier 16 moves along mast 14 with upper guide wheels 94*a* and lower guide wheels 94*b*.

Lock actuator 182 (FIG. 11A) comprises aluminium profile or frame 194 and polyethylene anti-wear strip 196 that may contact block 184. In the illustrated embodiment actuator 198 comprises an electromagnet.

Locking mechanism 29*b* (FIGS. 2A, 11B) is schematically illustrated and comprises in this illustrated embodiment (locking) rail 108 with supporting surfaces 200. Locking element/pawl 202 is provided with support surface 204. In a locked position, support surface 204 of pawl 202 engages one of the supporting surfaces 200 of rail 108. On the other side of locking element 202 a secondary support surface 206 can be supported by support 208. Lock actuator driver 210 acts as drive for locking element 202 and moves element 202 between a locked state and an unlocked state using plunger or shaft 212, with bolt 214 allowing the movement between both states. It will be understood that an alternative locking mechanism 29*b* can also be envisaged in accordance with the present invention. In the illustrated embodiment lock sensor 29*a* comprises an inductive sensor that measures the position of cam 29*c*. In a first embodiment rail 108 is provided on carrier 16 and locking element 29*b* is provided on frame/mast 4 of lifting column 2. In a second embodiment rail 108 is provided on frame/mast 4 of lifting column 2 and locking element 29*b* is provided on carrier 16.

Profile 194 (FIG. 12) comprises hole or opening 216 with a number of protrusions or nocks 218. The other end profile frame 194 is provided with hole or opening 220 having a number of protrusions or nocks 222, with hole 220 capable of receiving PE strip 196. Sensor 29*d* is attached to plate or frame 29*e* of the lifting system and is capable of detecting the position of profile 194.

When lifting car 6 a number of mobile lifting columns 4 are positioned around vehicle 6. When the lifting operation is approved carriers 16 start moving along masts 14. As soon as the desired height D above ground surface 8 is reached, locking system 29*b* is activated. Locking system 29*b* activates lock actuator 182 to rotate, with lock actuator 182 comprising profile 194 and anti-wear strip 198. Lock actuator 182 rotates between a locked state and an unlocked state. Lock actuator 182 is pivotally connected at its outer ends to mast 14 or other parts of the lifting column. When rotating lock actuator 182 block or pawl 184 will engage or disengage from locking rail 108. Rail 108 preferably extends along mast 14. As a further advantage, as the length of lock actuator 182 corresponds to the length of stroke of cylinder 104, carrier 16 can be locked at any desired height along mast 14. This further improves the operation of lifting column of the present invention.

Preferably, in case of a power failure, the electromagnet of lock actuator driver 210 is turned off and profile 194 returns to its inactive position wherein block 184 engages locking rail 108. Optionally, a user may manually operate rod 188 to disengage block 184 from locking rail 108 to lower carriers 16, for example. This contributes to providing a safe working environment with an effective lifting column. It will be understood that other embodiments or configurations for locking mechanism 29*b* can also be envisaged in accordance with the present invention.

Pallet truck mechanism/displacement system 224 (FIGS. 2A, 13) comprises wheel 12*a* that is capable of rotating around shaft 13 (FIGS. 13-18C). Wheel 12*a* is connected to displacement housing 226. Connecting block 228 is configured for connecting displacement system 224 to column 4. Rod or shaft 230 extends through housing 226 between wheel 12*a* and steering handle 232. Handle 232 is pivotally connected to rod 230 at hinge 234. Connector 236 connects steering handle 232 at hinge 238 and connects to rod 230 at hinge 240.

Figure 13:
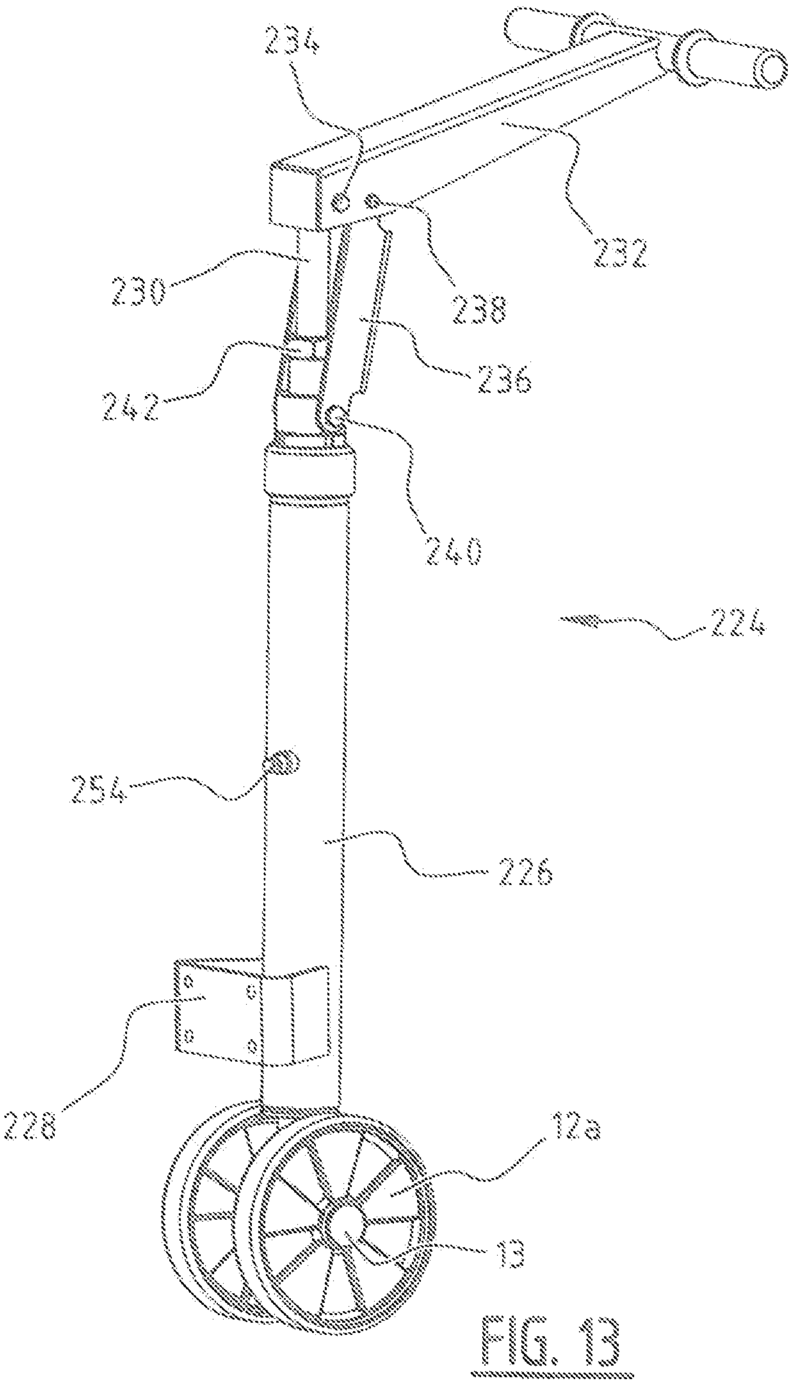
FIGS. 13-16 show an embodiment of a displacement system for a lifting column according to the present invention.
Figure 14:
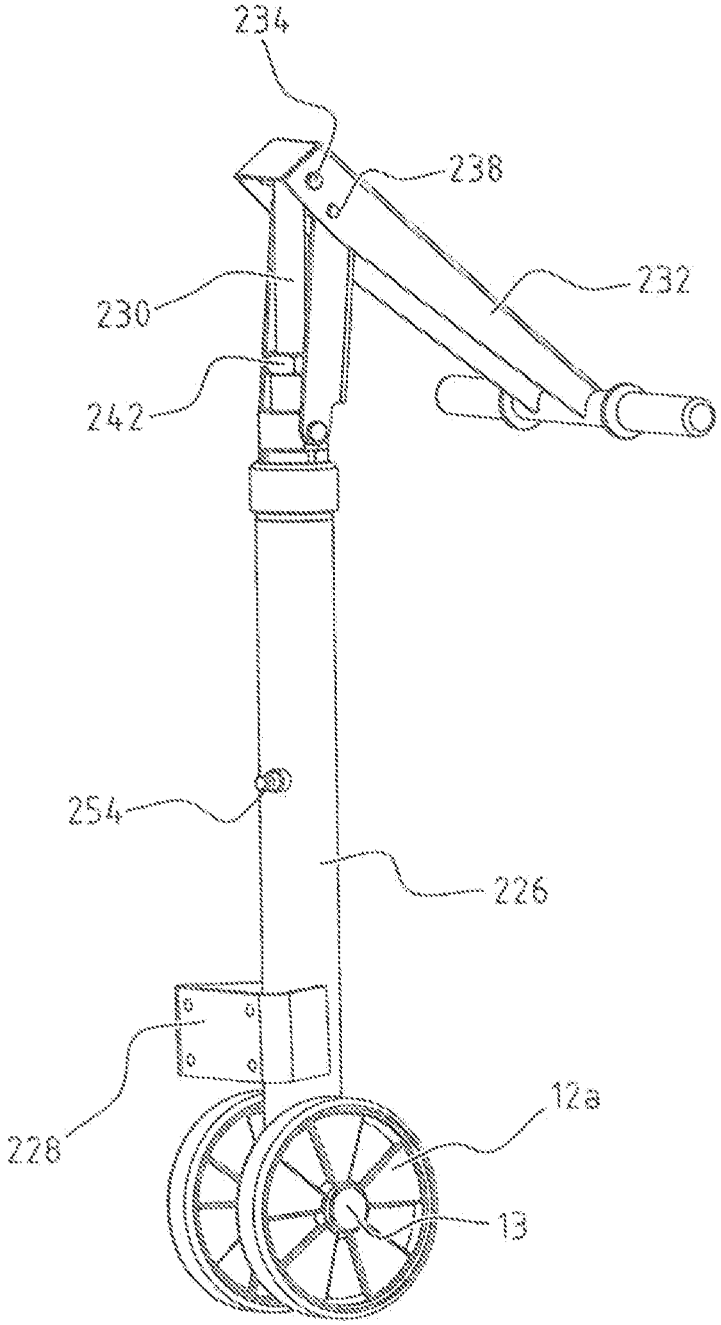
Figure 15:
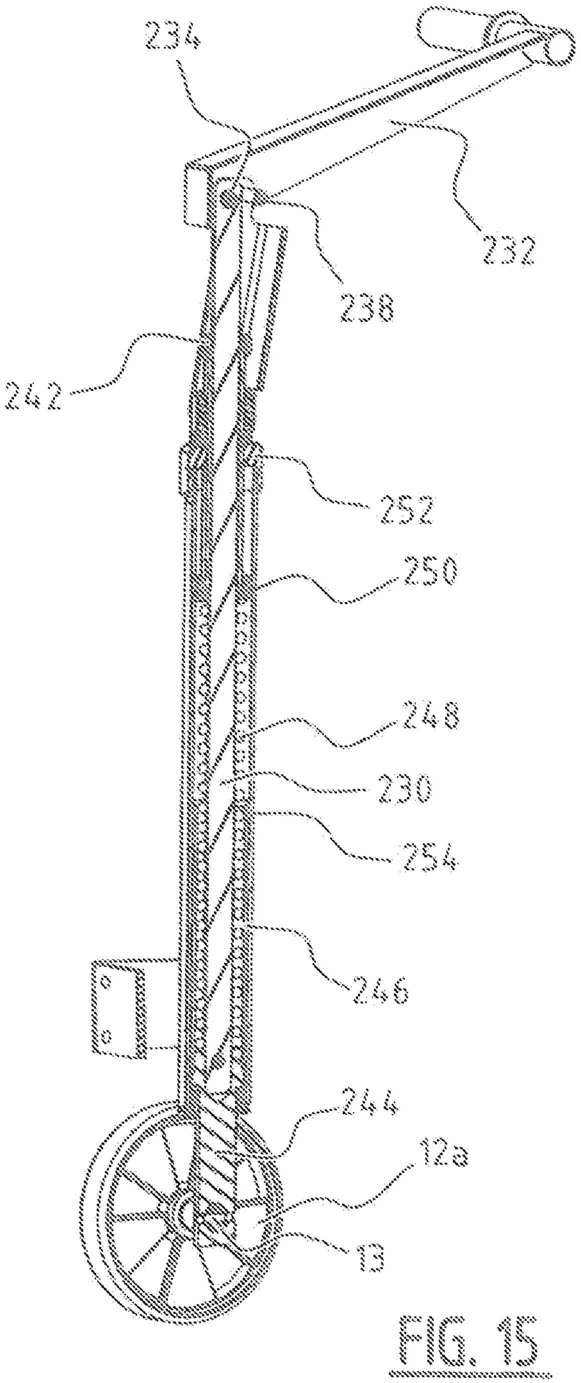
Figure 16:
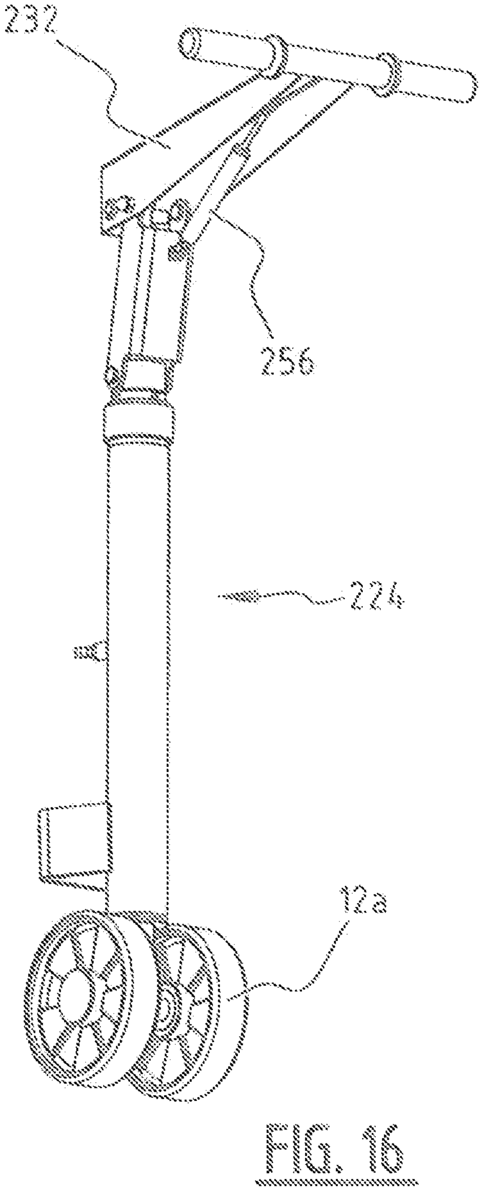
Figure 17A:
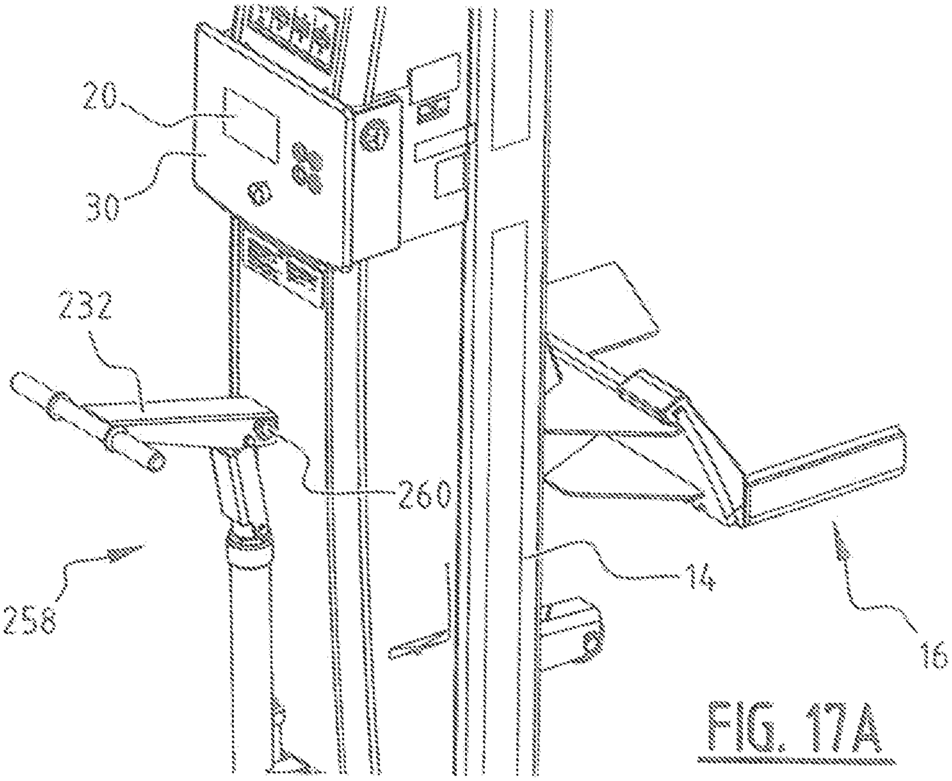
FIGS. 17A-B and 18A-C show details of an alternative embodiment of a displacement system for a lifting column according to the present invention.
Figure 17B:
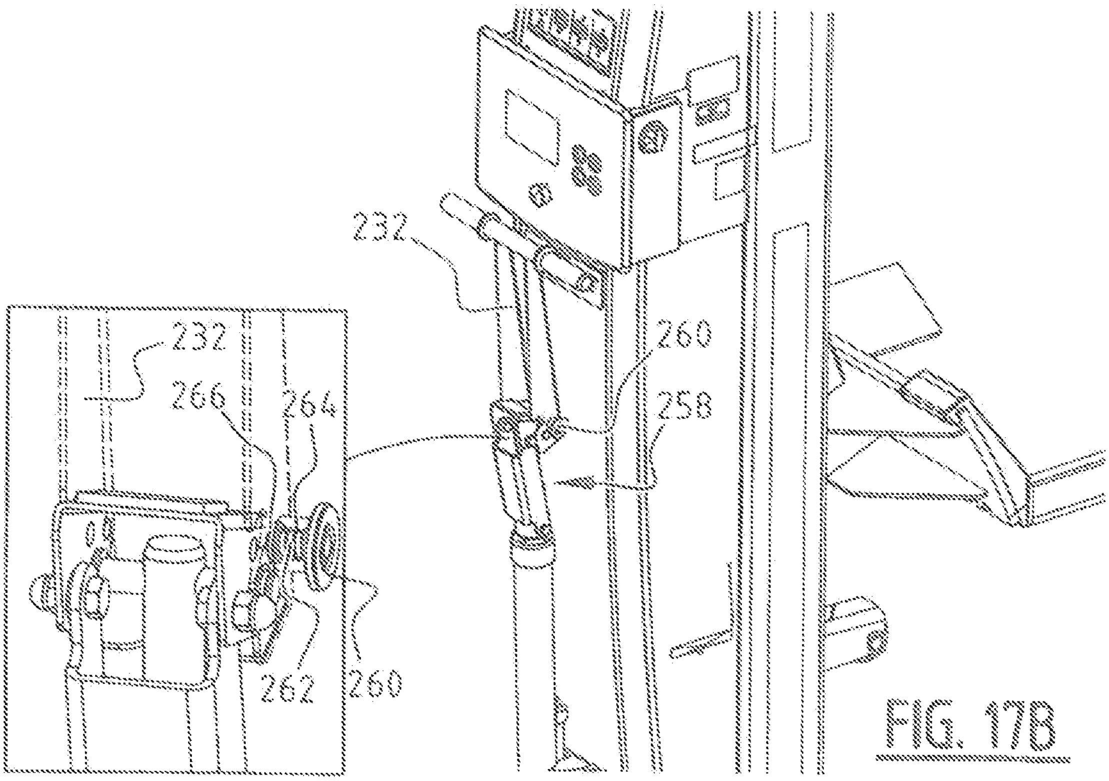
Figure 18A:
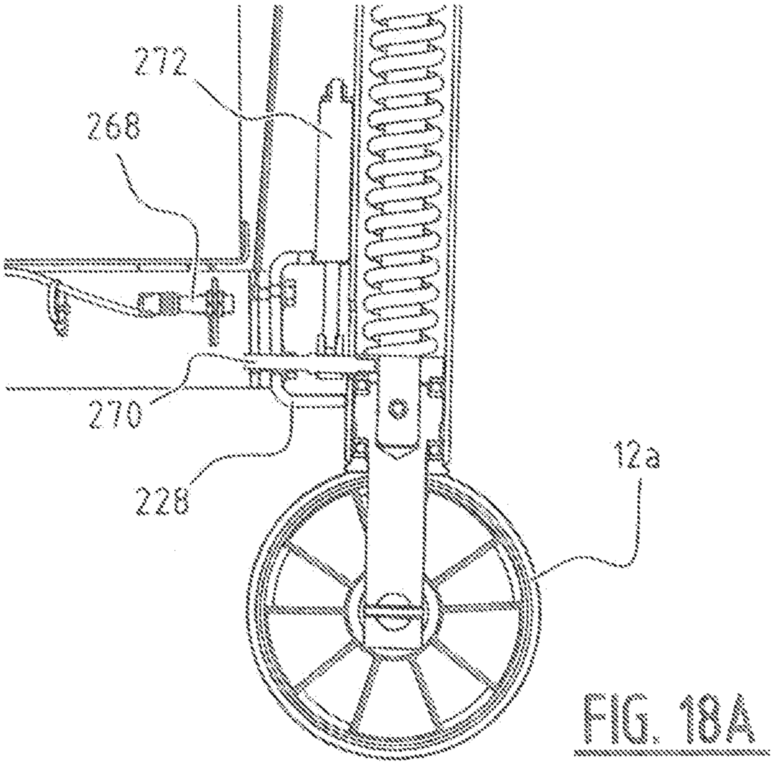
Figure 18B:
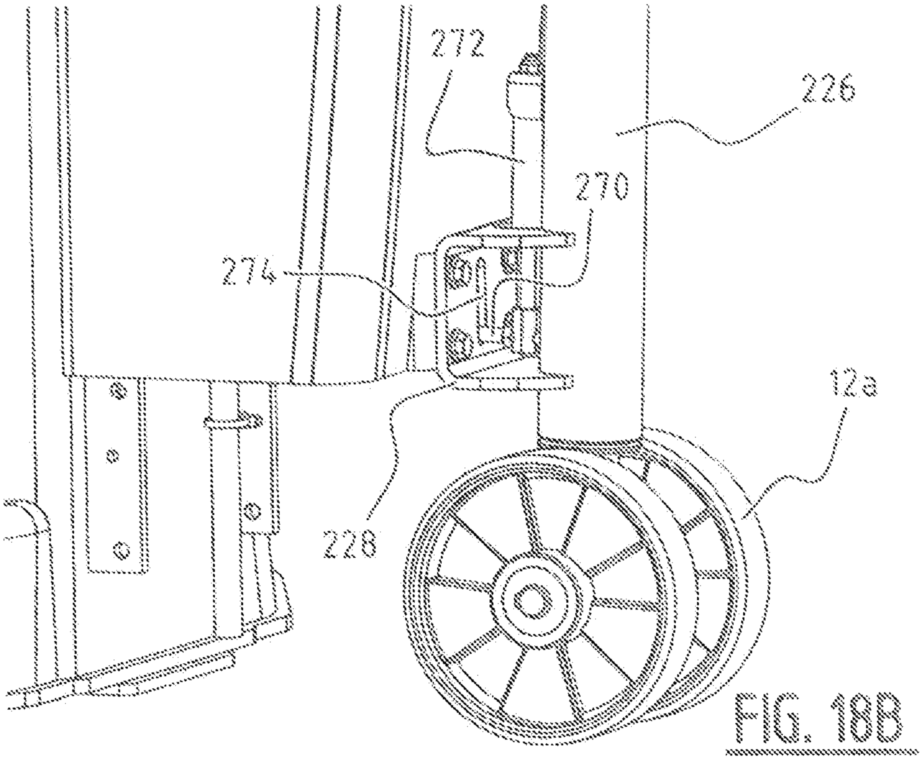
Figure 18C:
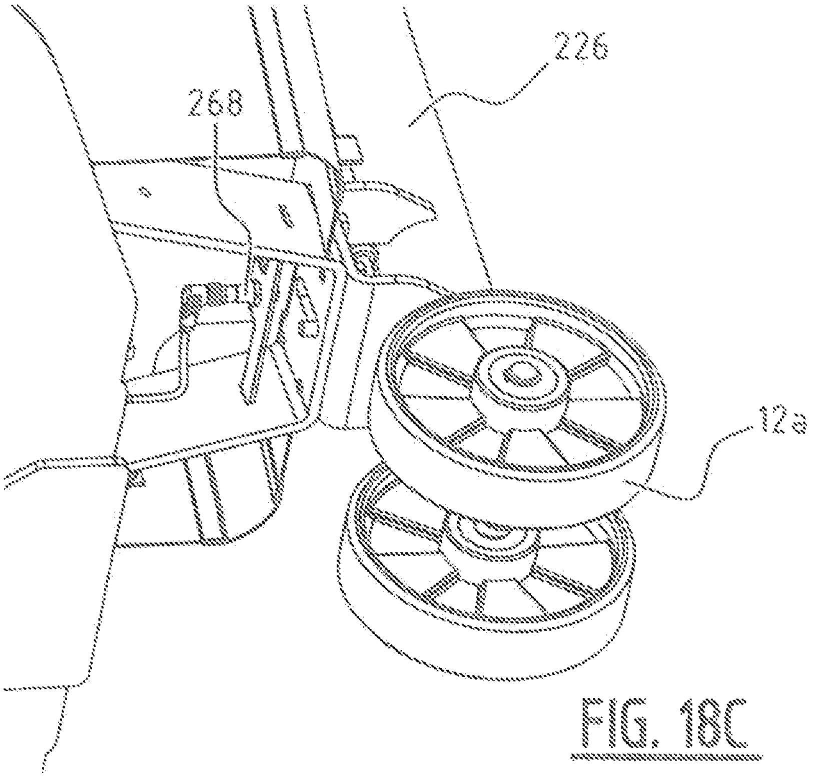

Attached to rod or shaft 230 is adjustment screw 242 (FIGS. 13-15). In the illustrated embodiment adjustment screw 242 enables adjustment of the counter force. Connecting rod 244 (FIG. 15) is connected to shaft 13 of wheel 12*a* and to rod 230. Connecting rod 244 extends along rod 230, optionally moving with a separate metal bush 246. In the illustrated embodiment spring 248 is provided between rod 230 and connecting rod 244 or bush 246. Adjustment screw 242 enables setting the counter force that is achieved by spring 248 by positioning piston like element 250 relative to spring 248 with screw 242. Stop 252 prevents fouling of spring 248, for example. Sensor 254 is configured for detecting the position of bush or profile 246. This provides a measure for the actual position of displacement system 224.

Optionally, damping element 256 (FIG. 16) is provided below steering handle 232. In the illustrated embodiment damping element 256 comprises an oil damper that damps the movement of handle 232 from the stationary to the displacement position. When moving handle 232 from the displacement to the stationary position damping element 256 preferably has no substantial effect. Damping element 256 is optionally applied in all illustrated and/or described embodiments.

When positioning lifting column 4, displacement system 224 is in the displacement position (FIG. 13) wherein mobile lifting column 4 can be moved relative to passenger car 6 and/or another lifting column 4. When lifting column 4 has reached its desired position, steering handle 232 is moved downwards, with the overcenter linkage, to the stationary position (FIG. 14). In this stationary position, lifting column 4 is ready for a lifting operation wherein foot 10 rests on ground surface 8 of a carriage or workshop floor.

In a situation wherein lifting column 4 is unintentionally in a displacement position (FIG. 13), while the lifting operation with passenger car 6 is started, its load will exceed the counter force of spring 248. This forces displacement mechanism 224 to move from the displacement position to the stationary position, thereby providing a safer environment. Optionally, sensor 254 detects that displacement mechanism 224 is in the wrong position, thereby blocking operation of lifting column 4.

After the lifting operation has ended, displacement mechanism 224 can be brought from the stationary position to the displacing position by moving steering handle 232 in upwards direction. This enables moving lifting column 4 to another position/location.

In an alternative embodiment displacement mechanism/pallet truck mechanism 258 (FIGS. 2A, 17A-B) comprises handle 232. In the displacement position (FIG. 17B) handle 232 can be positioned in an upright position. When manoeuvring with column 4 stopping/braking is achieved by pulling handle 232 such that wheel 12*a* is retracted. This improves the overall safety when working with column 4 and makes manoeuvring easier. Furthermore, when storing column 4, handle 232 can be placed in an upright position such that less space is required. Also, displacement mechanism 258 can be used effectively when loading/unloading lifting columns 4, 4' from a truck with handle 232 in an upright position. In the illustrated embodiment, unlocking handle 232 is achieved by pulling button 260, preferably in an upward or outward direction such that lock 262 is pushed by spring 264 in opening 266. Preferably, mechanism 258 (FIGS. 18A-C) comprises position detector 268 that is attached to the frame of column 4. Detector 268 detects the position of metal bush or pen 270. This configuration has the advantage that mechanism 258 can be removed from column 4 without removing any wiring. Optionally, damper 272 is mounted between metal bush or pen 270 and displacement housing 226 to damp movements when handle 232 is brought into the displacement position. Pen 270 moves along slotted opening 274 in connecting block 228.

Figure 19A:
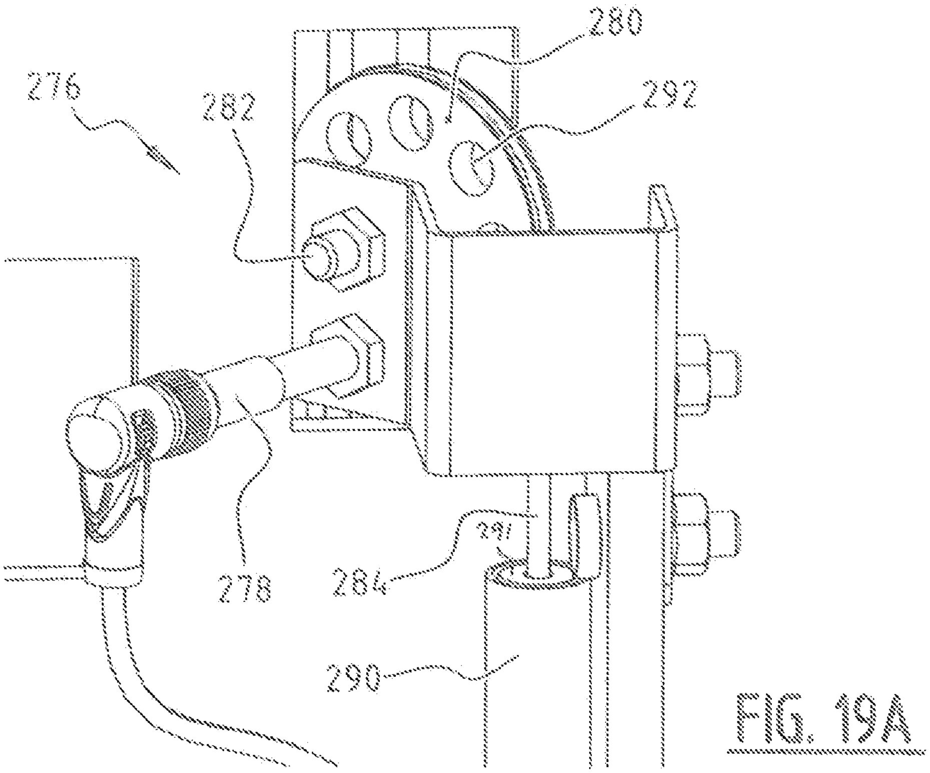
FIG. 19A-B shows details of a measurement system for detecting movement of the carrier for a lifting column according to the present invention.
Figure 19B:
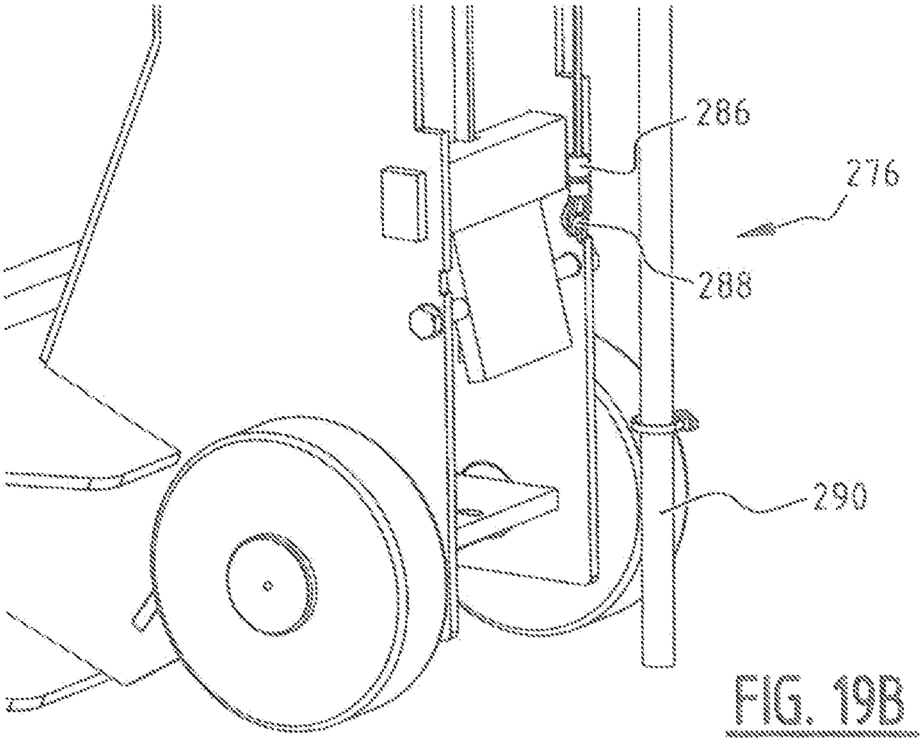

Optionally, movement sensor system 276 (FIGS. 19A-B) comprises sensor 278 that detects movement of wheel 280. Wheel 280 is mounted on shaft 282. Cord 284 initiates movement of wheel 280. Cord 284 is at first end 286 connected to carrier 16 with hook 288, or other suitable connecting means, and at a second end provided with a weight. In the illustrated embodiment cord 284 runs through pipe 290 with weight 291. Detector 278 detects openings 292 in wheel 280. This provides an additional safety measure and/or measurement system to monitor desired and/or undesired movements of carrier 16.

Figure 5:
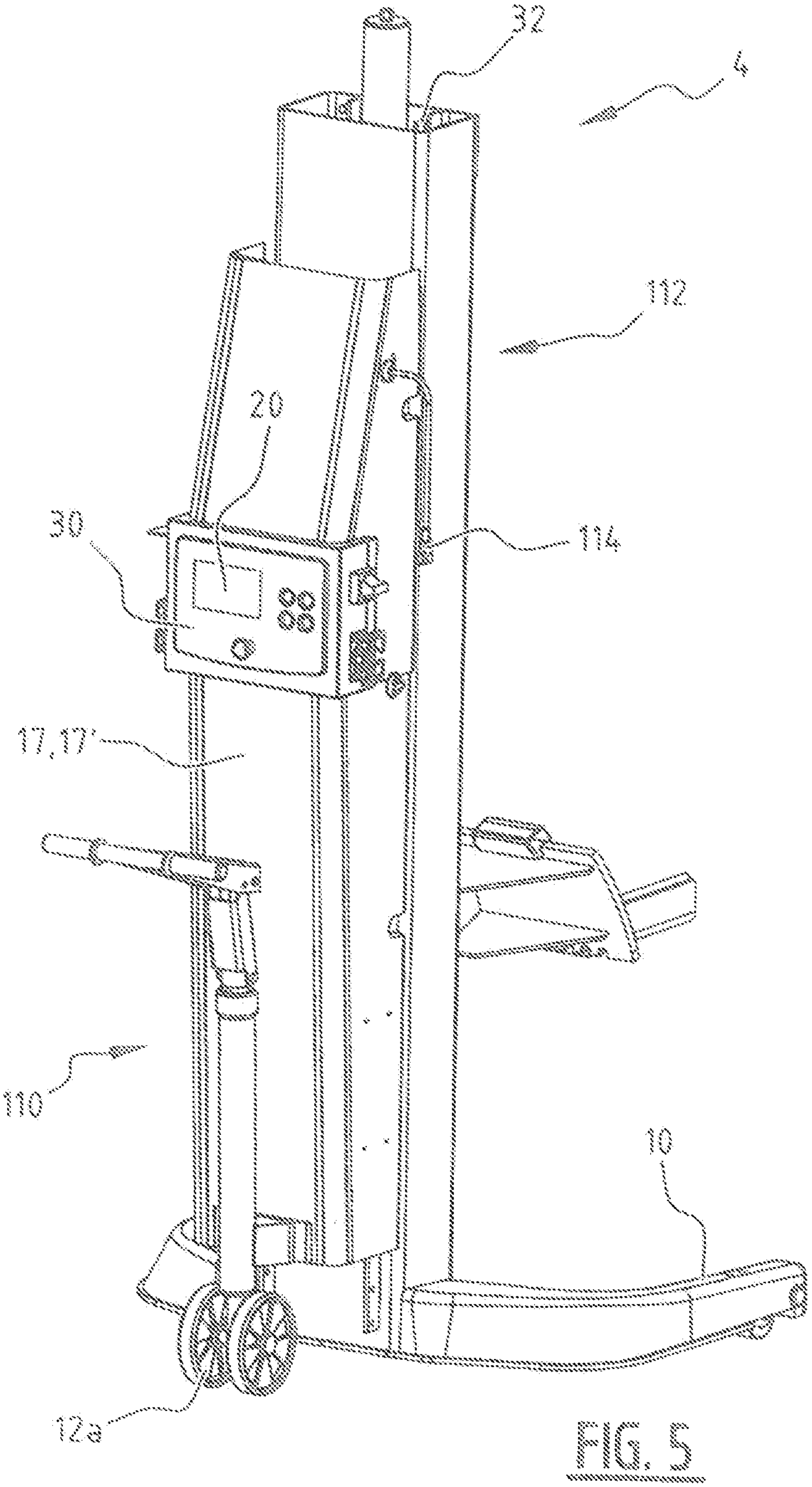
FIG. 5 shows a further view of the lifting column of FIG. 4.
Figure 20:
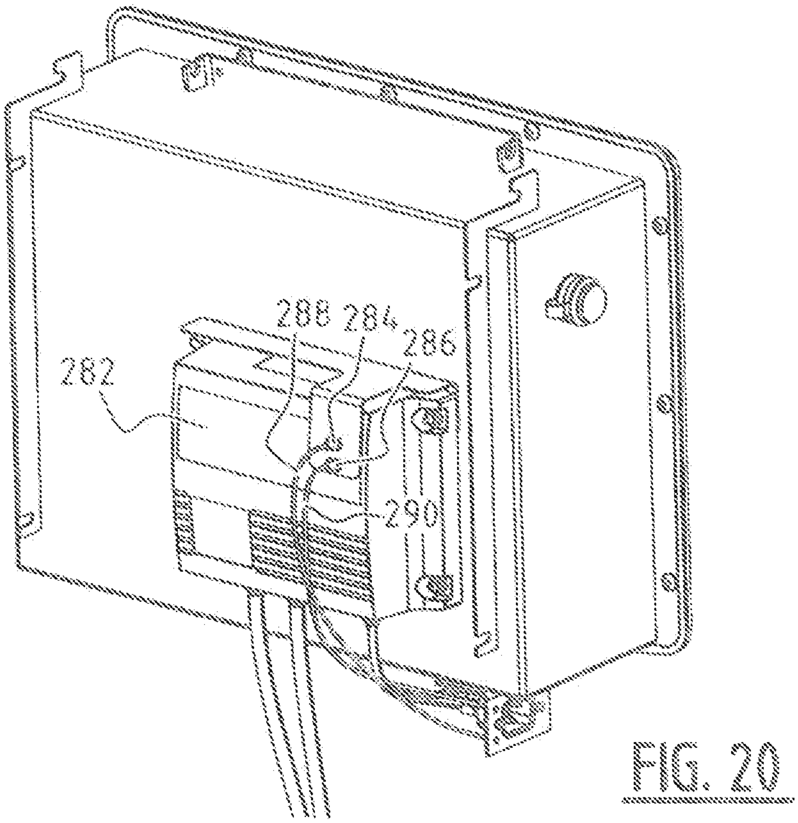
FIG. 20 shows an indicator for the status of the recharger of batteries for a lifting column according to the present invention.

In a presently preferred embodiment, batteries 120, 122 (FIG. 6) can be recharged with charger 282 (FIG. 20). This also applies to charger 112 (FIG. 5). Outputs 284, 286 (FIG. 20) indicate the status of charger 282 and/or batteries 120, 122. To enable an operator to check this status outputs 284, 286 are connected to wires 288, 290 acting as light pipes, preferably a fiber optic cable (PMMA). This enables checking the status of charger 282 and/or batteries 120, 122 directly at the outside of column 4. It will be understood that alternatives for wires 288, 290 can be envisaged, for example using LEDs.

Figure 21A:
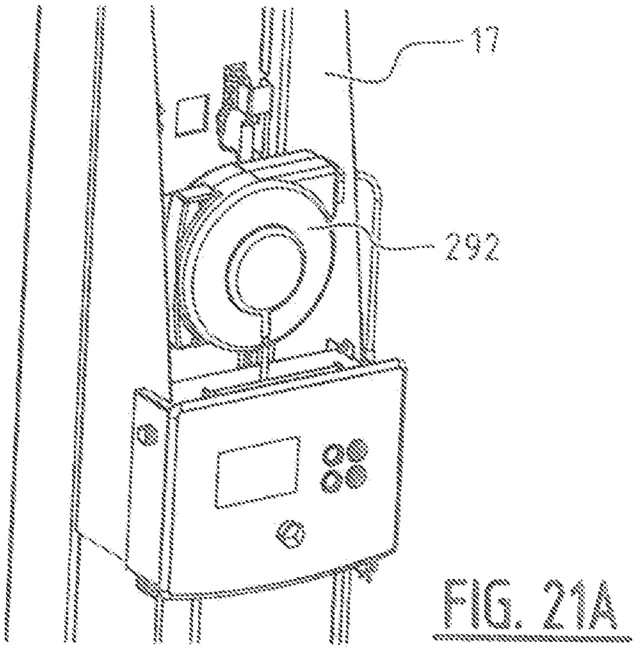
FIG. 21A-B shows a cable drum and connectors for a lifting column according to the present invention.
Figure 21B:
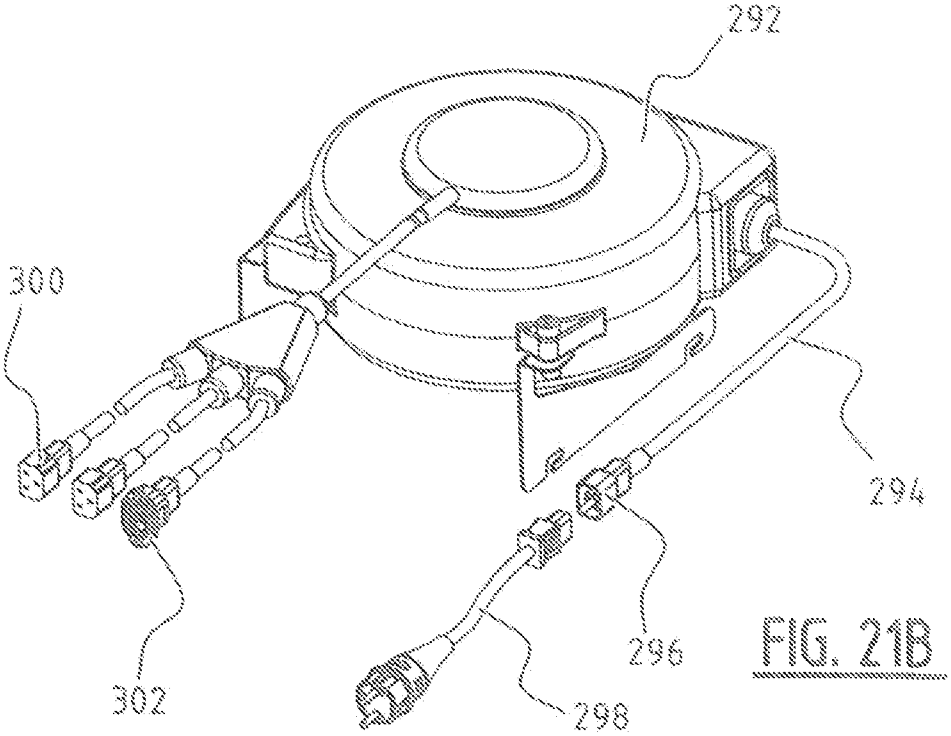

Column 4, 4' is preferably provided with cable drum 292 (FIGS. 21A-B) with cable 294 in housing 17, 17'. This also applies to cable/connector 114 (FIG. 5). In the illustrated embodiment cable 294 (FIGS. 21A-B) is provided with IEC14 connector 296 that is extendable with adapter cable 298, preferably with a locking mechanism. At the other side of drum 292 connectors 300 are provided to enable connecting other lifting columns 4, 4' and/or other parts of column 4, 4'. In the illustrated embodiment one of connectors 300 is provided with connector chassis 302 enabling another column to connect. One of the other connectors 300 is connected to charger 282 and another connector 300 acts as spare, optionally for connecting socket-outlet(s). This enables charging batteries 120, 122, preferably without relocating columns 4, 4'.

Figure 22A:
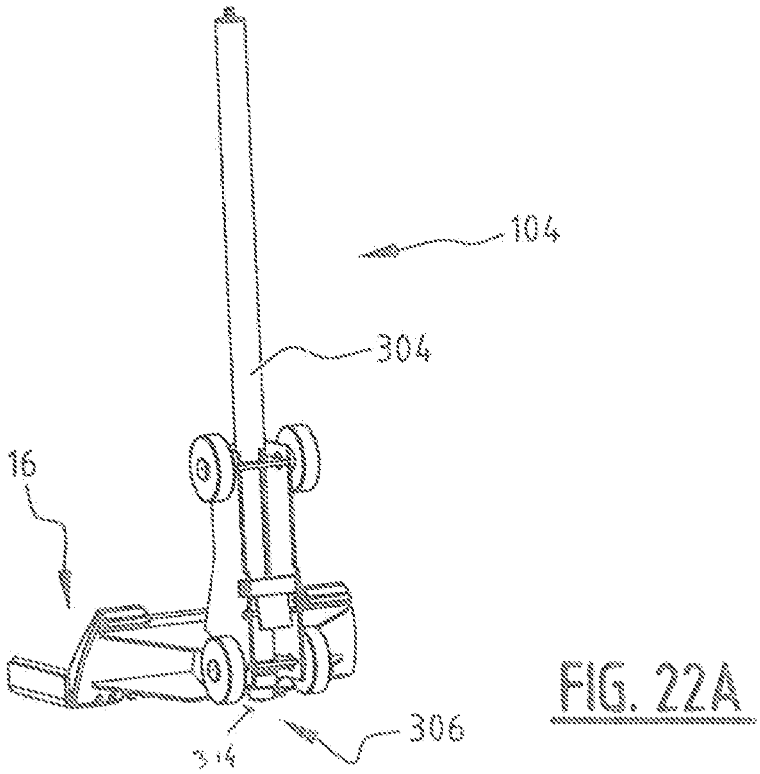
FIG. 22A-B shows alternative mounting configurations of a cylinder in a lifting column according to the present invention.
Figure 22B:
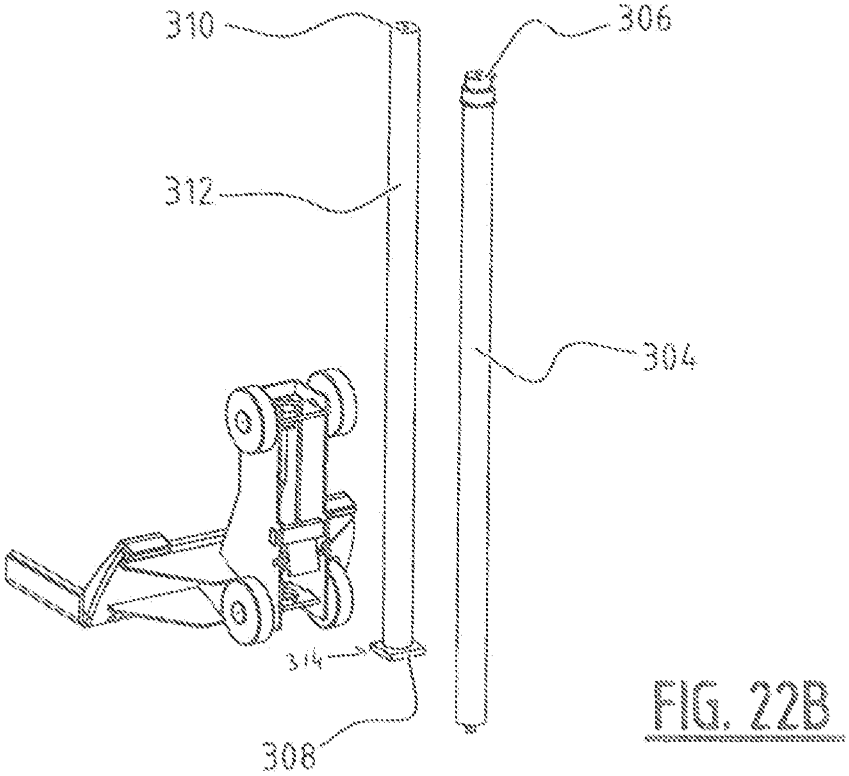

In a further preferred embodiment cylinder 104 (FIG. 4) comprises housing 304 (FIG. 22A) that in a first configuration is attached to carrier 16 and plunger 306 that is provided at the bottom of housing 304. In an alternative embodiment in a second configuration (FIG. 22B) housing 304 is mounted at plate 308 and plunger 306 moves cover 310 of (additional) pipe 312. In the illustrated embodiments the attachments are made with connectors 314.

It will be understood that other embodiments, combinations of illustrated features, and configurations can be envisaged in accordance with the present invention.

The present invention is by no means limited to the above described preferred embodiments. The rights sought are defined by the following claims within the scope of which many modifications can be envisaged. For example, lifting columns according to the invention include wired or wireless mobile type lifting columns, lifting columns of the two-post lift type with pivoting support arms, the four-post lifting column types with runways, the, in-ground lifts etc.

Furthermore, height differences between individual lifts within one set are detected and corrected by the controller. This correction can be performed by increasing the speed of the "slowest" lift(s) that is behind while ascending or descending. Alternatively, the "fastest" lift(s) can be corrected. For example, the lift that ascends or descends faster than the other lifts can be adjusted. This adjustment may involve sending an adjusting steering signal to the (lifting) drive of the carrier of the specific lift. The lift may relate to different types of lifts, including mobile lifting columns and stationary and/or moveable lifts of an in-ground lifting system. It will be understood that this approach for adjustment can be also be applied to sets of only mobile lifting columns.

In addition, it will be understood that communication between lifting devices and/or with a (central) controller may involve the use of wireless communication. This reduces the amount of cables in a workshop, thereby improving the safety of working in such workshop. Wireless communication can be performed at different bandwidths, for example in the radio spectrum such as within a bandwidth of 300-430 kHz. It will be understood that the use of other bandwidths can also be envisaged. It will be understood that this wireless communication, preferably within this specific bandwidth, can be also be applied to sets of only mobile lifting columns.

Furthermore, a fuel cell based power supply (for example using hydrogen, ethanol or formic acid as fuel) to provide power for the column can be envisaged, for both lifting the column (carriage) and/or moving (driving) the column. The capacity of the fuel cell can be relatively small. For example, the "off" time of the column can be used to (slowly) charge the batteries. The batteries will act as an energy buffer and will be discharged when power is needed by the column. Also, a drive for moving the lifting column can be provided that uses one or more of a hydrogen powered drive, electric drive, or other suitable drive, optionally in combination with another drive such as a fuel cell.

The invention claimed is:

1. A mobile lifting column for lifting a vehicle, the column comprising:

a mast;

a carrier comprising a carrier part configured for carrying the vehicle and a carrier frame, wherein the carrier frame comprises a first plate connected to a pair of second plates to define a U-shape therebetween having an open end and a pair of connecting plates at upper and lower ends of the carrier frame, respectively, each connecting plate of the pair of connecting plates directly connected to the first plate and each of the second plates and arranged perpendicular to the first plate and each of the second plates, wherein the open end of the carrier frame faces the mast and is configured for guiding a movement of the carrier along the mast;

a drive system which acts on the carrier and is configured for raising and/or lowering the carrier relative to the mast; and a lifting controller configured for controlling movement of the carrier, and further comprising a displacement mechanism configured for positioning the lifting column, wherein the displacement mechanism comprises:

a displacement frame comprising a housing, and a wheel that is provided at a first end of the housing, wherein the wheel is moveable relative to the displacement frame between a displacement position where the lifting column can be displaced and a stationary position where the lifting column is in a stationary position;

a counter force element provided in or on the displacement frame; and a steering handle that is operatively coupled to the wheel with a linkage mechanism that is configured for moving the wheel relative to the displacement frame, wherein the steering handle is connected to the displacement frame at a second end of the housing.

2. The mobile lifting column according to claim 1, further comprising a position sensor that is configured for detecting a position of the displacement mechanism.

3. The mobile lifting column according to claim 2, wherein the position sensor comprises an induction detector that is provided in or on the housing.

4. The mobile lifting column according to claim 3, wherein the position sensor further comprises a metal bush that moves with the wheel relative to the housing and the detector when moving the wheel between the displacement and stationary positions.

5. The mobile lifting column according to claim 2, wherein the controller comprises a displacement mode that is directly or indirectly activated by the position sensor detecting an intended displacement of the lifting column.

6. The mobile lifting column according to claim 2, further comprising an indoor positioning detector configured for detecting an absolute and/or relative position of the lifting column.

7. The mobile lifting column according to claim 2, further comprising a shock absorber or a damper.

8. The mobile lifting column according to claim 1, further comprising a lifting column position detector.

9. The mobile lifting column according to claim 1, wherein the counter force element is a spring element substantially extending along a displacement frame axis between the wheel and the steering handle, and wherein a counter force of the counter force element is adjustable.

10. The mobile lifting column according to claim 1, wherein the linkage mechanism comprises a rod that extends between the wheel at the first end of the housing and the handle at the second end of the housing, and is connected to the handle, wherein the handle is pivotally connected to the housing at a hinge and the displacement mechanism further comprises a lever or balance with the linkage mechanism being pivotally connected to the lever or balance, and wherein the handle acts as the lever or balance.

11. The mobile lifting column according to claim 1, further comprising an energy supply with one or more batteries, and further comprising a charging device, wherein the controller comprises a charging monitor configured for monitoring a regenerative charging process when lowering a load.

12. The mobile lifting column according to claim 1, wherein the drive system further comprises connectors such that a drive cylinder of the drive system can be positioned in a first configuration and a second configuration, and wherein the first and second configurations have bottom and top ends of the cylinder reversed.

13. The mobile lifting column according to claim 1, further comprising a locking system for locking and unlocking the carrier frame relative to the mast, wherein the locking system comprises:

a lock actuator and a locking rail that both extend over at least a part of a height of the carrier frame;

a locking drive configured for moving the lock actuator between a locked state and an unlocked state; and a lock that is provided at or on the carrier and is configured for engaging and/or disengaging the locking rail in response to a movement of the lock actuator.

14. The mobile lifting column according to claim 13, wherein the lock actuator and the locking rail are provided in or at the carrier frame, and wherein the lock actuator is provided in the carrier frame with a connection such that the lock actuator may rotate around its axis when moving between the locked and unlocked states.

15. The mobile lifting column according to claim 13, wherein the locking system comprises a locking mechanism that further comprises a rod extending between the lock and the carrier, wherein the rod is connected to the carrier with a hinged connection and substantially extends in a vertical direction, and wherein the hinged connection is configured such that it automatically moves the lock in the locked state when the lock actuator is not activated.

16. The mobile lifting column according to claim 1, further comprising a light pipe element configured for indicating a battery status.

17. A lifting system for lifting a vehicle, the lifting system comprising a number of mobile lifting columns for lifting a vehicle, each mobile lifting column comprising:

a mast;

a carrier comprising a carrier part configured for carrying the vehicle and a carrier frame, wherein the carrier frame comprises a first plate connected to a pair of second plates to define a U-shape therebetween having an open end and a pair of connecting plates at upper and lower ends of the carrier frame, respectively, each connecting plate of the pair of connecting plates directly connected to the first plate and each of the second plates and arranged perpendicular to the first plate and each of the second plates, wherein the open end of the carrier frame faces the mast and is configured for guiding a movement of the carrier along the mast;

a drive system which acts on the carrier and is configured for raising and/or lowering the carrier relative to the mast; and a lifting controller configured for controlling movement of the carrier, and further comprising a displacement mechanism configured for positioning the lifting column, wherein the displacement mechanism comprises:

a displacement frame comprising a housing, and a wheel that is provided at a first end of the housing, wherein the wheel is moveable relative to the displacement frame between a displacement position where the lifting column can be displaced and a stationary position where the lifting column is in a stationary position;

a counter force element that is provided in or on the displacement frame; and a steering handle that is operatively coupled to the wheel with a linkage mechanism that is configured for moving the wheel relative to the displacement frame, wherein the steering handle is connected to the displacement frame at a second end of the housing.

18. The lifting system according to claim 17, wherein the lifting system comprises a central controller for centrally controlling one or more of the number of lifting columns, the central controller comprising:

a transmitter/receiver for communication with individual lifting columns; and a processor, for determining required control actions for individual lifting columns;

wherein at least one of the central controller or at least one of the lifting columns comprises user input controls configured for providing the central controller with input, and wherein the central controller controls one or more groups of selected lifting columns.

19. A method for lifting a vehicle with a lifting system comprising a number of mobile lifting columns each mobile lifting column comprising:

a mast;

a carrier comprising a carrier part configured for carrying the vehicle and a carrier frame, wherein the carrier frame comprises a first plate connected to a pair of second plates to define a U-shape therebetween having an open end and a pair of connecting plates at upper and lower ends of the carrier frame, respectively, each connecting plate of the pair of connecting plates directly connected to the first plate and each of the second plates and arranged perpendicular to the first plate and each of the second plates, wherein the open end of the carrier frame faces the mast and is configured for guiding a movement of the carrier along the mast;

a drive system which acts on the carrier and is configured for raising and/or lowering the carrier relative to the mast; and a lifting controller configured for controlling movement of the carrier, and further comprising a displacement mechanism configured for positioning the lifting column, wherein the displacement mechanism comprises:

a displacement frame comprising a housing, and a wheel that is provided at a first end of the housing, wherein the wheel is moveable relative to the displacement frame between a displacement position where the lifting column can be displaced and a stationary position where the lifting column is in a stationary position;

a counter force element provided in or on the displacement frame; and a steering handle that is operatively coupled to the wheel with a linkage mechanism that is configured for moving the wheel relative to the displacement frame, wherein the steering handle is connected to the displacement frame at a second end of the housing, the method comprising the steps of:

positioning the vehicle into a lifting position relative to the lifting system; and lifting the vehicle.

* * * * *